United States Patent [19]
Warehime et al.

[11] Patent Number: 5,645,303
[45] Date of Patent: Jul. 8, 1997

[54] COMPACT PIPE COUPLING DEVICE

[75] Inventors: Kevin S. Warehime, Taneytown; Daniel T. Munley, Laurel; Thomas S. Oh, Columbia; Jeffrey E. Swensen, Eldersburg, all of Md.

[73] Assignee: EG&G Pressure Science, Inc., Beltsville, Md.

[21] Appl. No.: 329,985

[22] Filed: Oct. 27, 1994

[51] Int. Cl.⁶ .................. B65D 63/02; F16L 17/06
[52] U.S. Cl. .................. 285/409; 285/410; 285/367; 285/411; 24/279
[58] Field of Search .................. 24/279, 282, 285; 285/409, 410, 411, 367

[56] References Cited

U.S. PATENT DOCUMENTS

| | | | |
|---|---|---|---|
| 196,807 | 11/1877 | Jolliffe et al. | 285/409 |
| 1,966,039 | 7/1934 | Muchnic | 285/411 |
| 2,673,102 | 3/1954 | Hutchinson | 285/409 |
| 2,689,141 | 9/1954 | Kiekhaefer | 285/410 |
| 2,706,648 | 4/1955 | Gosse | 285/409 |
| 2,752,174 | 6/1956 | Frost | 285/409 |
| 3,151,373 | 10/1964 | Whitcomb | 24/279 |
| 3,325,176 | 6/1967 | Latham et al. | 285/367 |
| 3,458,217 | 7/1969 | Pride, Jr. et al. | 285/410 |
| 3,575,432 | 4/1971 | Taylor | 277/206 R |
| 3,600,770 | 8/1971 | Halling | 285/411 |
| 3,797,078 | 3/1974 | Lapointe | 24/279 |
| 3,797,079 | 3/1974 | Nixon | 285/411 |
| 3,797,836 | 3/1974 | Halling | 277/200 |
| 4,123,095 | 10/1978 | Stehlin | 285/409 |
| 4,341,406 | 7/1982 | Abbes et al. | 285/408 |
| 4,739,542 | 4/1988 | Krzesicki | 24/279 |
| 4,919,453 | 4/1990 | Halling et al. | 285/3 |
| 5,271,648 | 12/1993 | Krausz | 24/279 |
| 5,454,606 | 10/1995 | Voss et al. | 24/279 |
| 5,509,702 | 4/1996 | Warehime et al. | 285/409 |
| 5,513,228 | 4/1996 | Malmasson | 74/279 |

FOREIGN PATENT DOCUMENTS

| | | | |
|---|---|---|---|
| 1403430 | 5/1965 | France . | |
| 319534 | 3/1920 | Germany | 285/129 |
| 509738 | 7/1939 | United Kingdom | 285/411 |
| 1019322 | 2/1966 | United Kingdom | 285/367 |
| 1126872 | 9/1968 | United Kingdom . | |
| 1140636 | 1/1969 | United Kingdom . | |

OTHER PUBLICATIONS

Drawings with Part List for "EG&G Pressure Science V–Coupling with Compression Bolt", dated Oct. 7, 1994.
Aeroquip—"Assembly Instructions" for a Pipe Coupling, 1970's.

*Primary Examiner*—Eric K. Nicholson
*Attorney, Agent, or Firm*—Roylance, Abrams, Berdo & Goodman, L.L.P.

[57] ABSTRACT

A pipe coupling device for coupling the peripheral flanges of a pair of pipes together, including a pair of retainers with gripping grooves therein for receiving portions of the peripheral flanges of the pipes. The gripping grooves of the retainers have a unique inner surface with a pair of slanted gripping surfaces and a pair of non-gripping surfaces that are located within the outer envelope of the peripheral flanges. This provides for lightweight, compact retainers. The retainers are pivotally coupled at one of their ends by a hinge assembly and releasably coupled at their opposite ends by a latch mechanism. The hinge assembly has at least two links pivotally coupled at one of their ends to one of the retainers by a first pivot pin being received in a pivot slot formed in the retainer and pivotally coupled at their other end to the other retainer by a second pivot pin being received in a pivot slot formed in the retainer. The pivot slots are open holes in some embodiments to reduce the weight of the pipe coupling device. The pivot pins are separated from each other such that the links of the hinge assembly straddle the flanges of the pipes. The latch assembly utilizes coupling members with tenons which are received in coupling slots formed in the retainers.

80 Claims, 22 Drawing Sheets

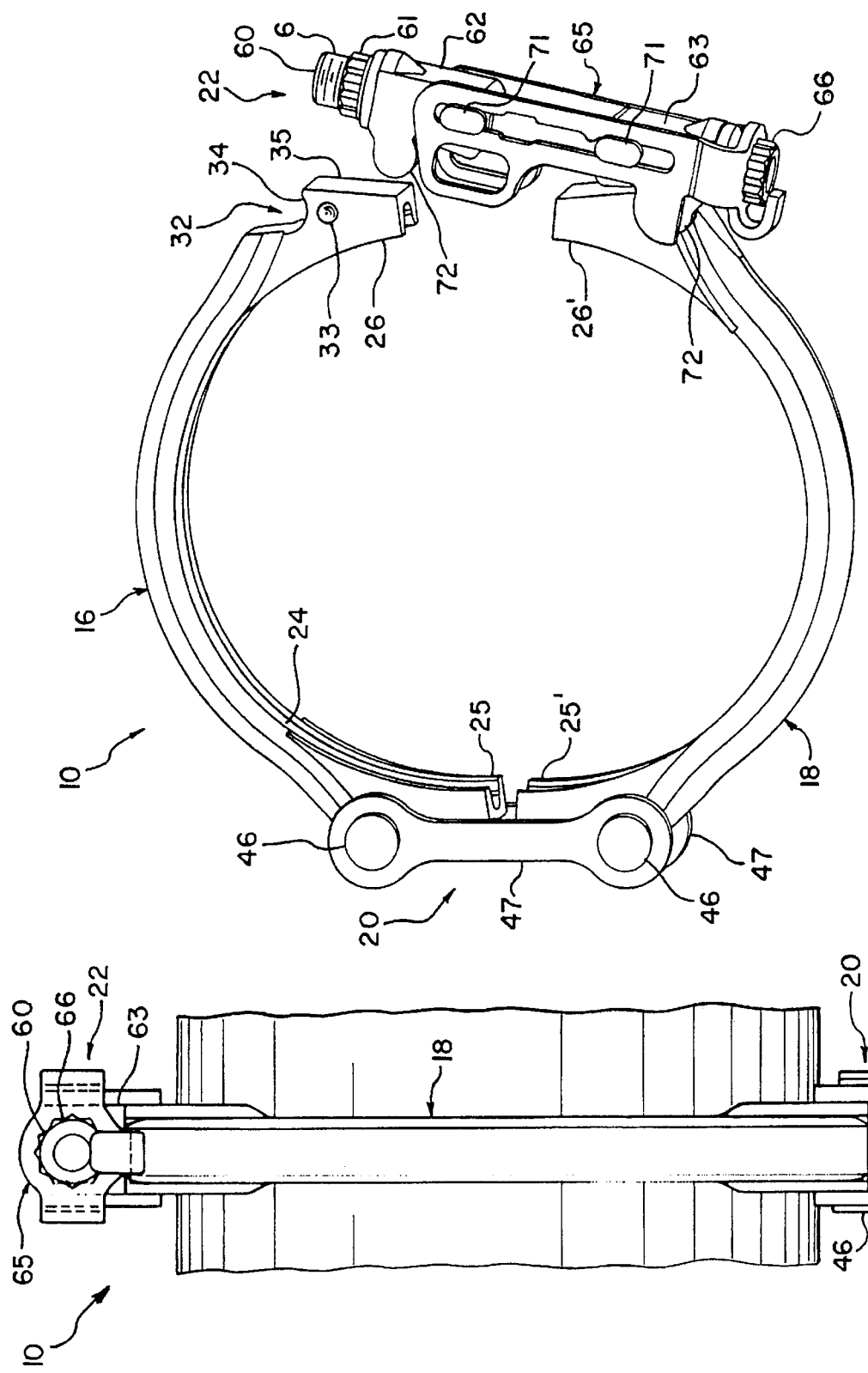

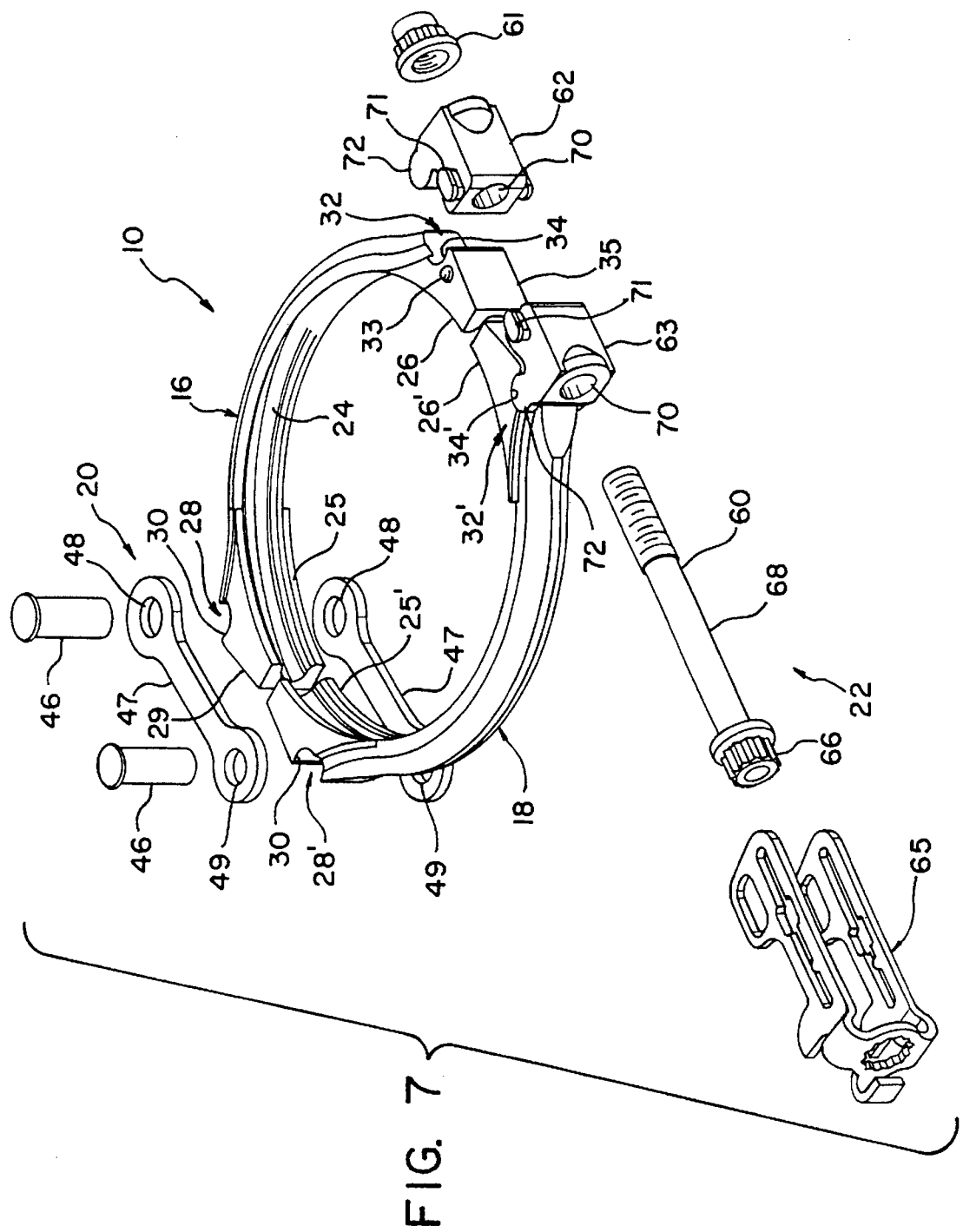

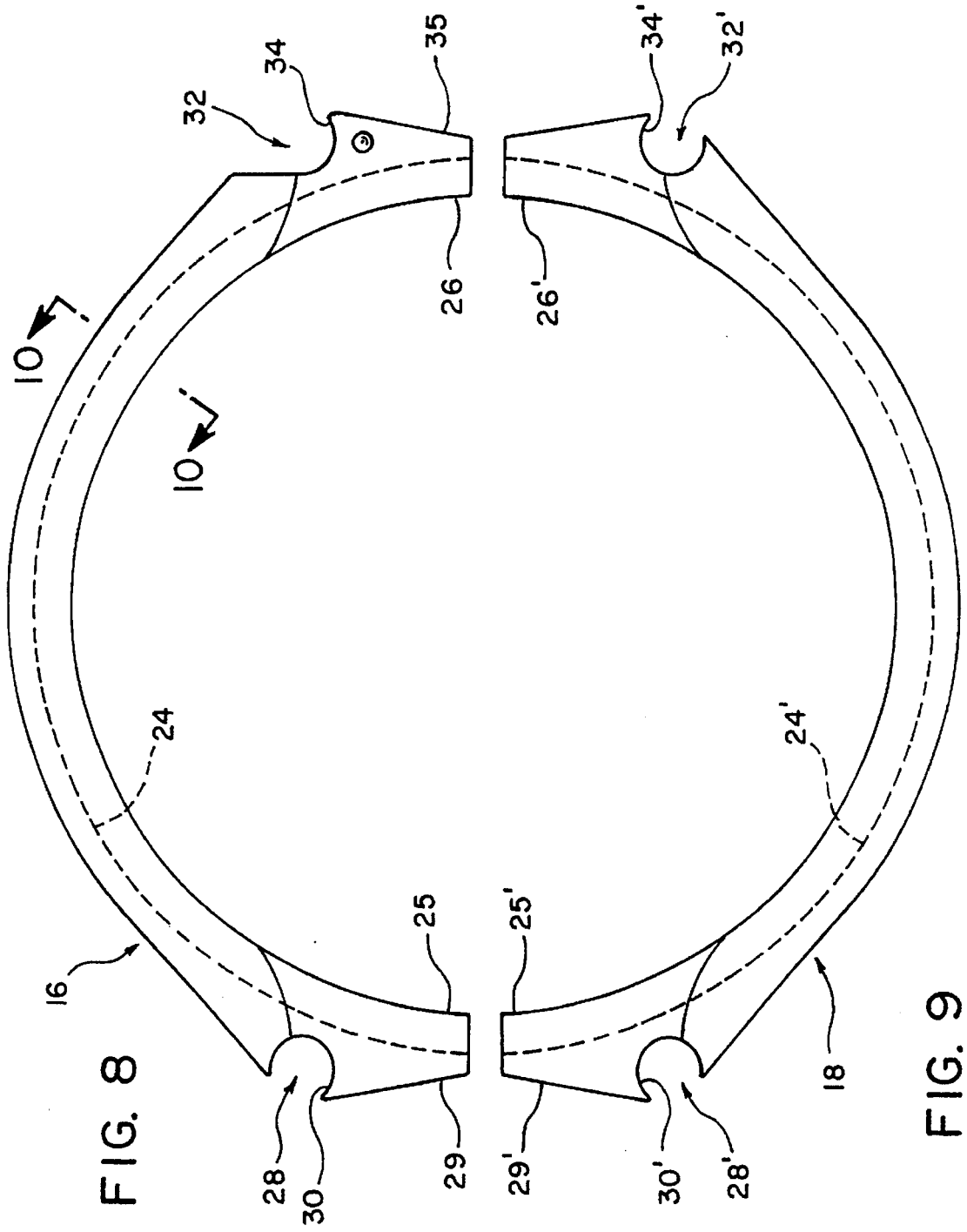

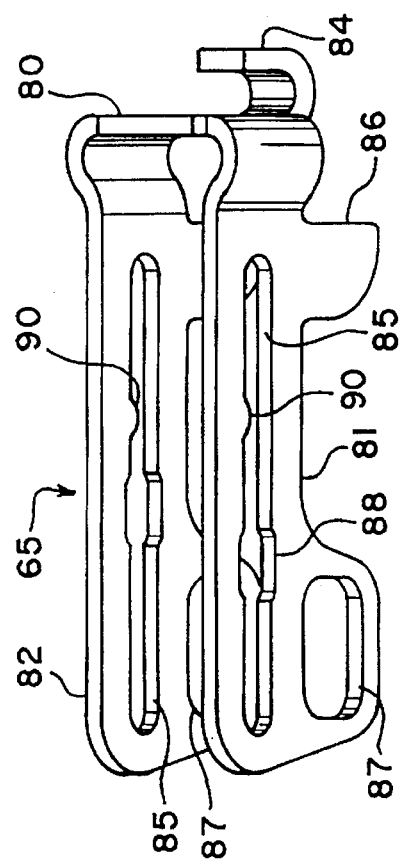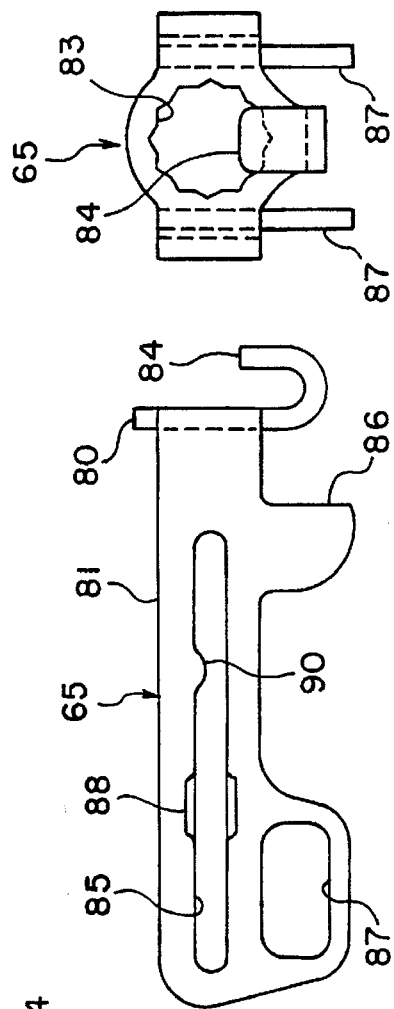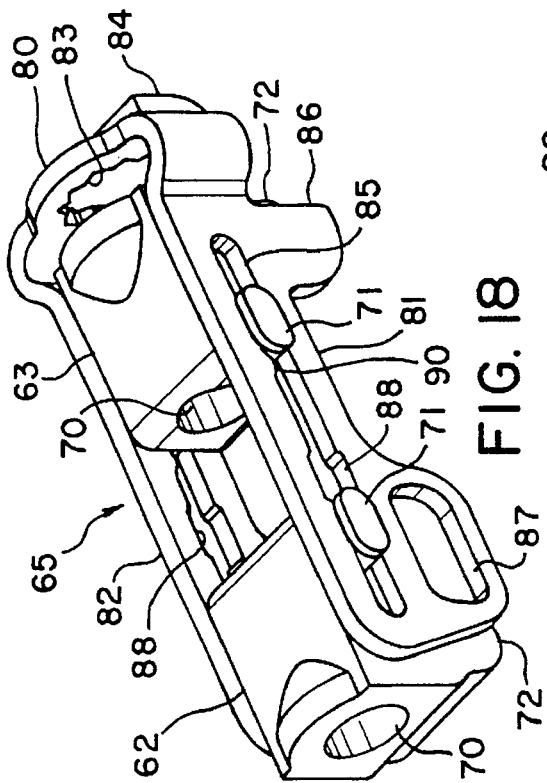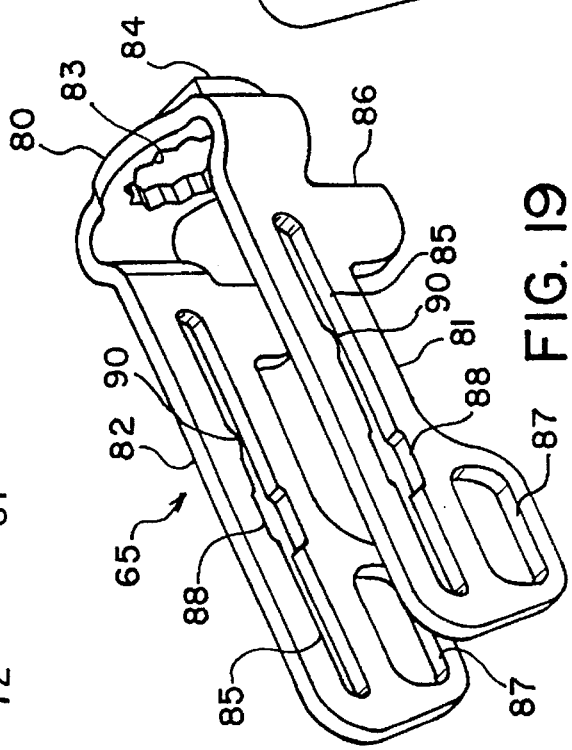

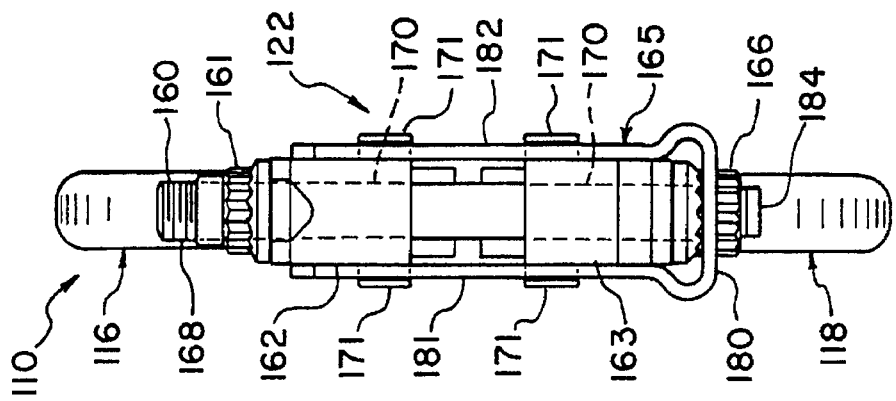
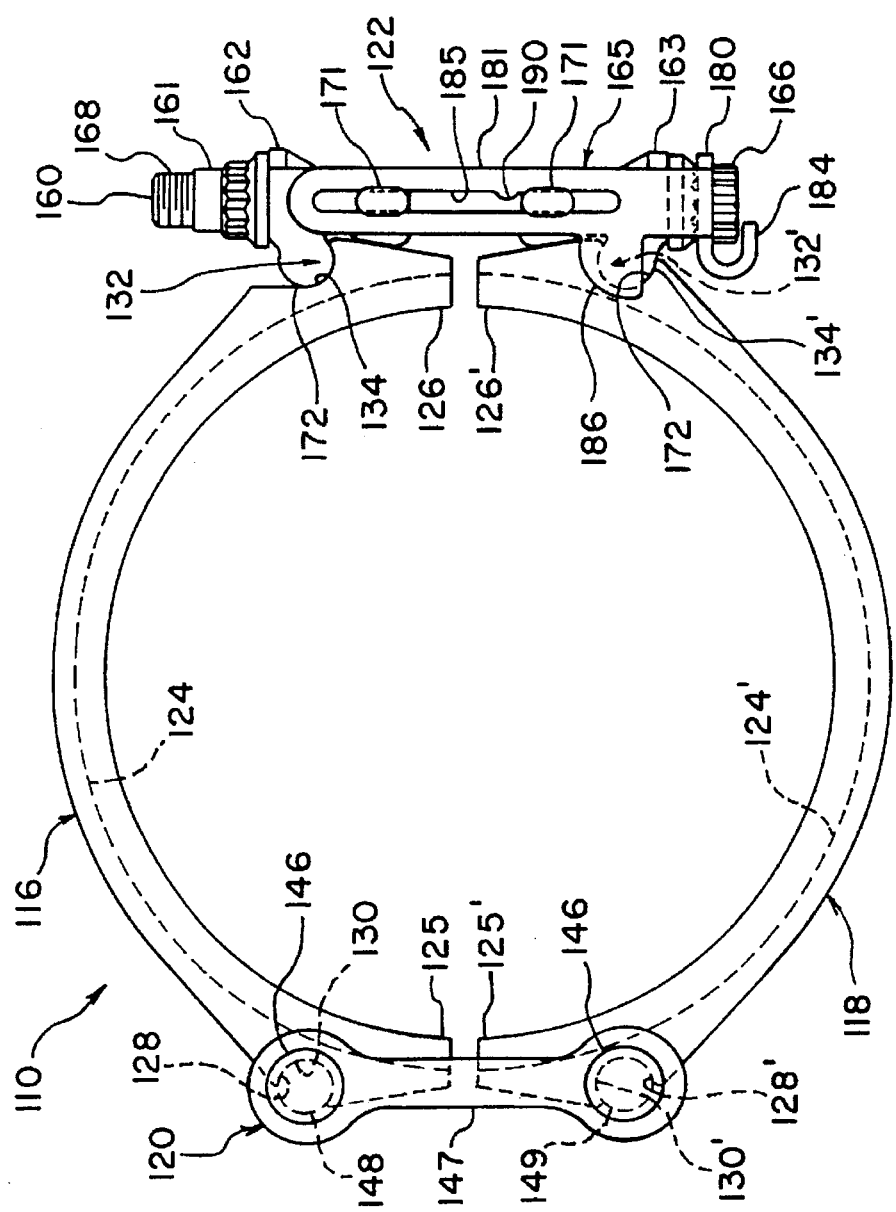

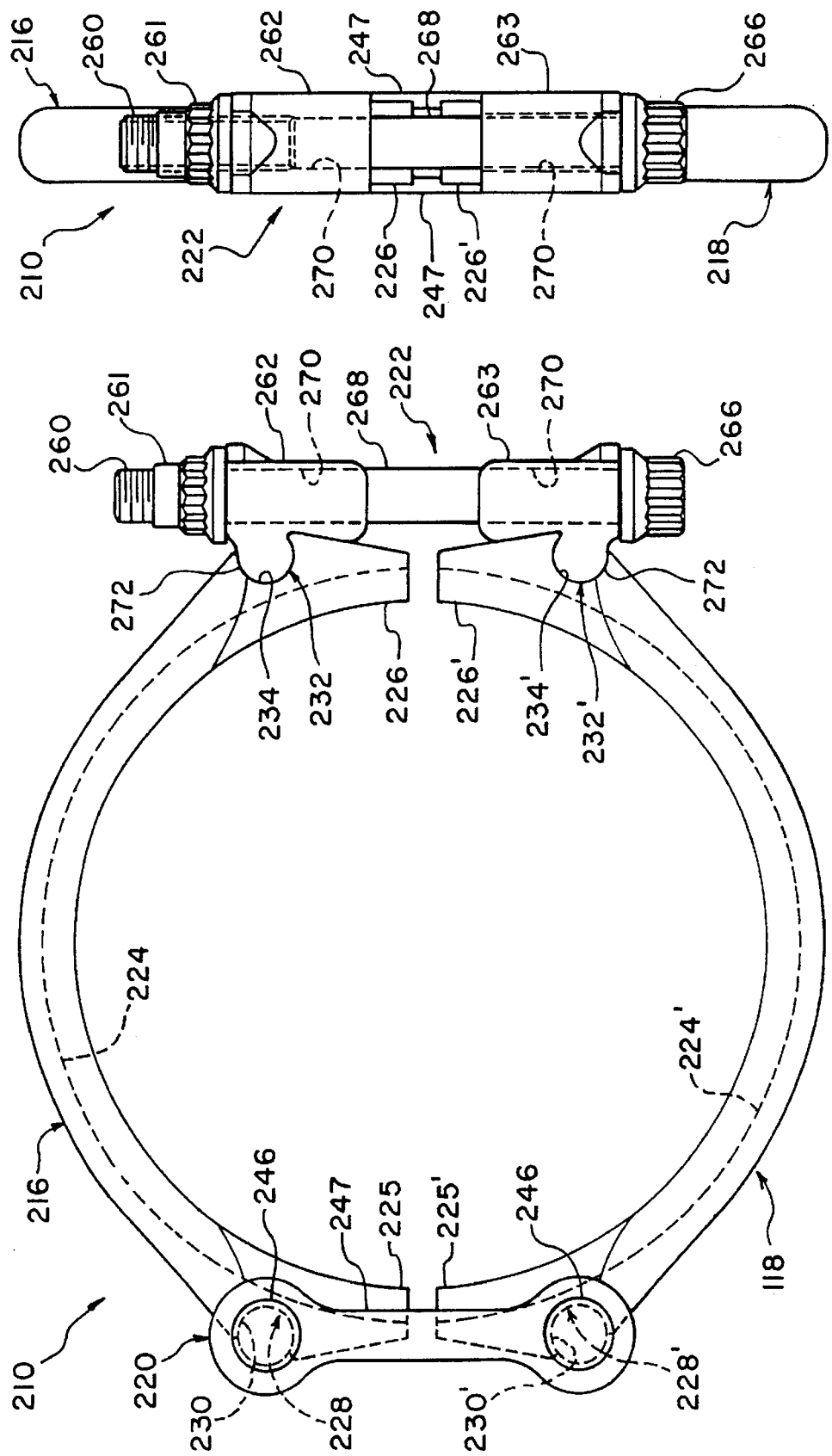

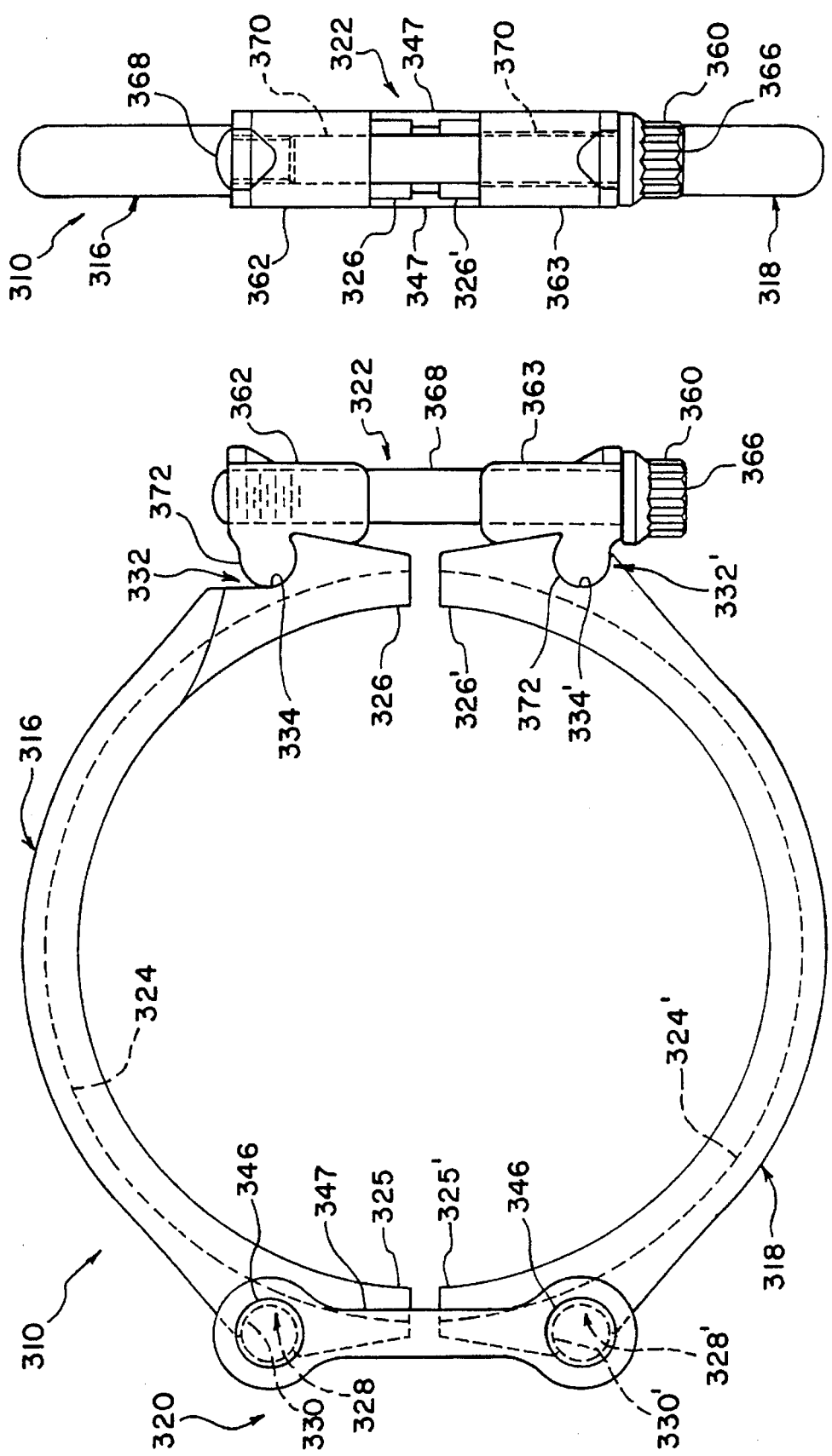

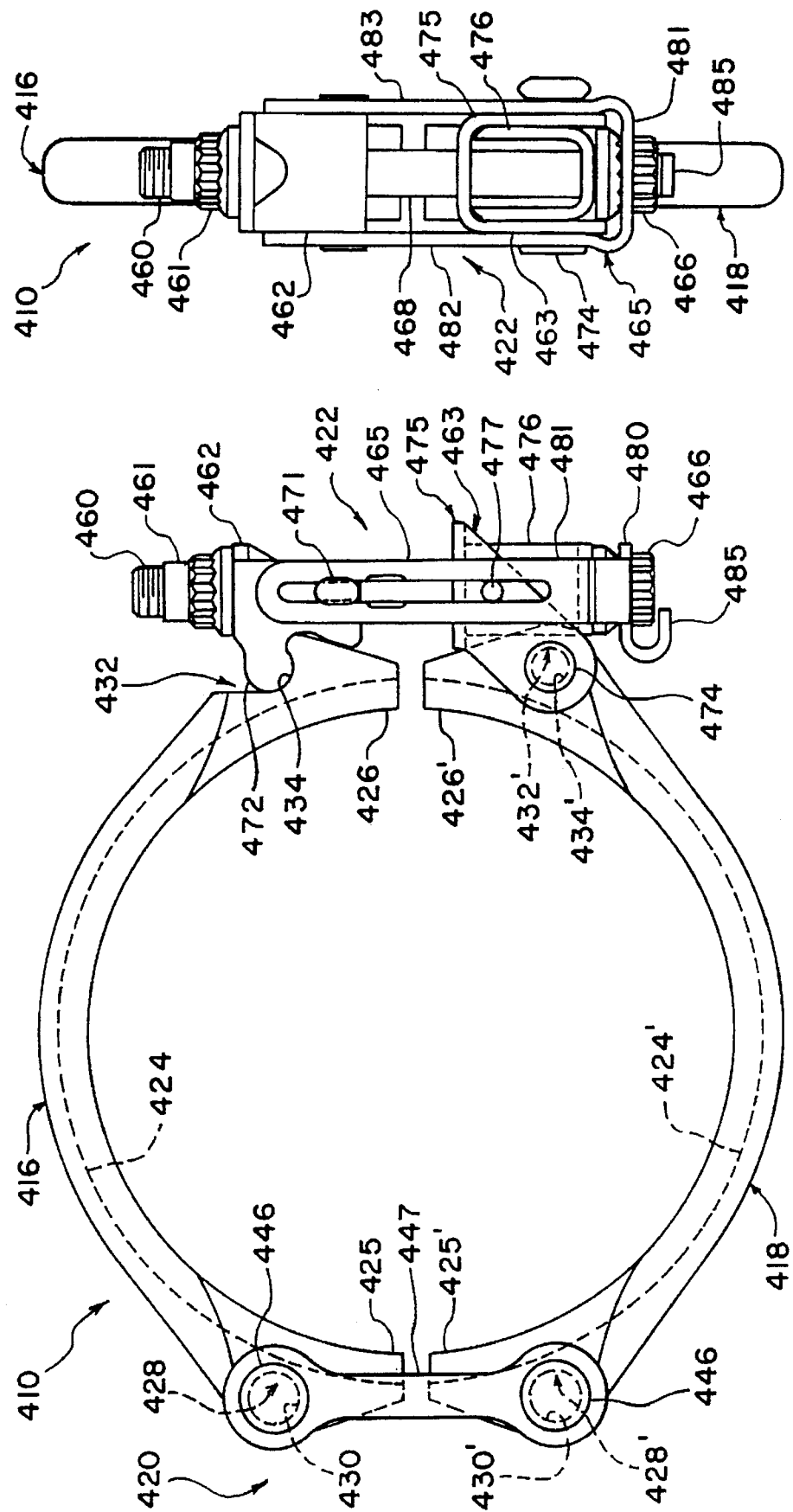

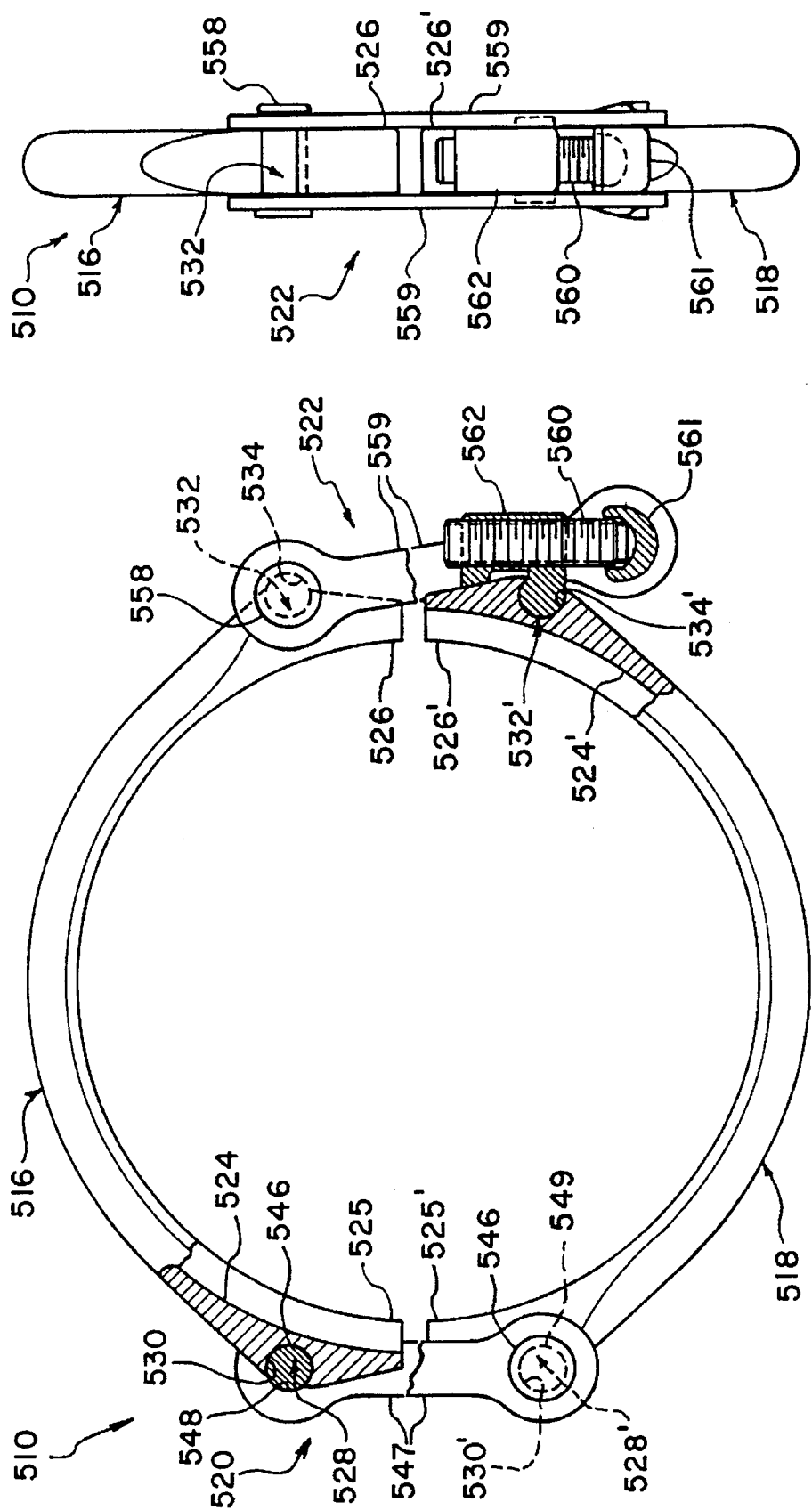

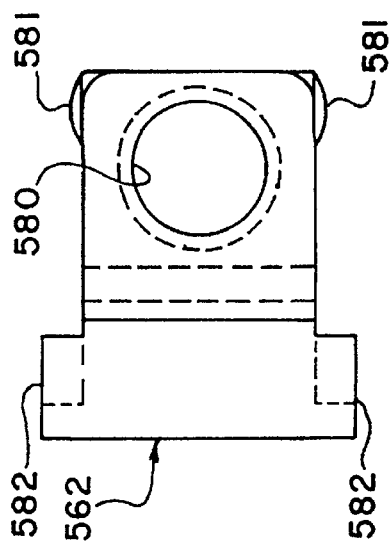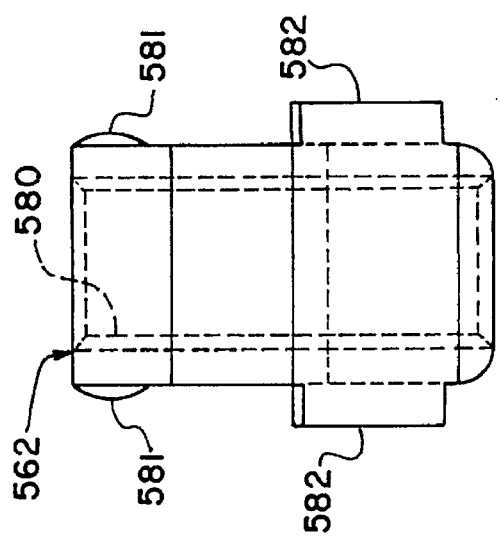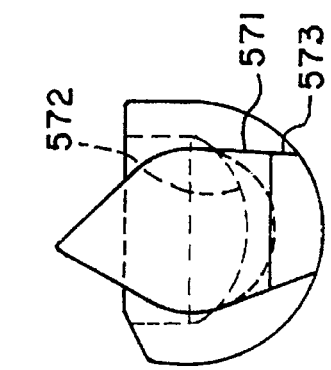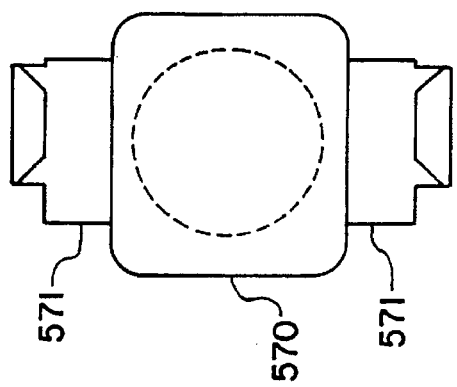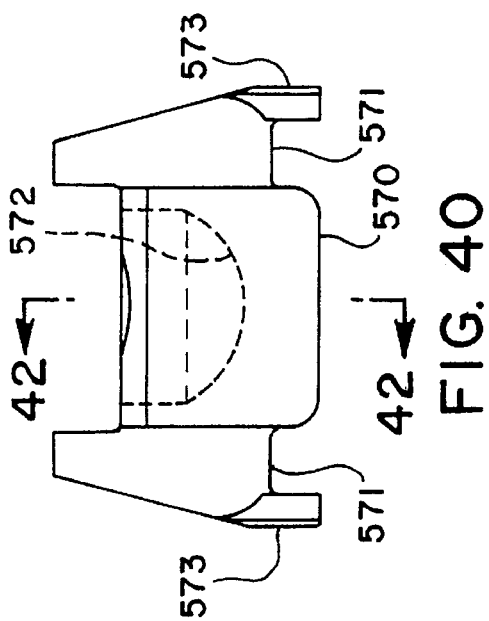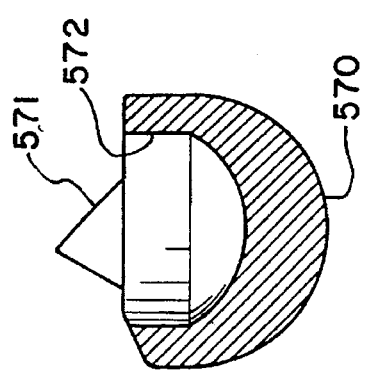

COMPACT PIPE COUPLING DEVICE

FIELD OF THE INVENTION

The invention relates to a low distortion pipe coupling device for coupling the end flange of one pipe to the end flange of another pipe. More specifically, the invention relates to a pipe coupling device having two arcuate retaining members or retainers which are coupled together at one end by a hinge and at the other end by a latch.

BACKGROUND OF THE INVENTION

Circular, V-couplings for clamping the peripheral end flanges of pipes together have been used for many years, especially in pipes conducting high temperature and pressure fluids. Currently there are many types of V-couplings available for connecting the peripheral end flanges of pipes. One of the more common type coupling is fabricated from sheet metal retainers attached to tension bands. Two examples of these types of pipe couplings are disclosed in U.S. Pat. Nos. 3,600,770 to Halling and 4,341,406 to Abbes et al. At first these types of pipe couplings were in widespread use in the aircraft and aerospace industries; however, their reliability was very questionable, owing to failures of their riveted or spot welded joints and fatigue failures of their tension bands.

Another common type of V-coupling was later introduced, using forged, cast or machined retainers, with integrally hinged ends joined by eyebolt fasteners and connecting links. While the "forged-style" couplings have proven extremely reliable and efficient, they suffer from one main disadvantage, which is addressed by the present invention.

Specifically, current "forged-style" couplings use tension-type swing-bolts and connecting links that are disposed at a considerable offset distance from the neutral axis of the coupling retainer channel section. The resultant movement produced by the fastener tightening torque causes inward rotation of the retainer ends which, in turn, locally deflects the flanges of the pipes inward. Opposite the fastener, the two retainers are joined by one or more non-adjustable links, which are offset from the circumferential loading line between the two retainers. This offset arrangement in this type of coupling is essential to the proper functioning of the coupling so that tension is transmitted through the linked retainer ends entirely symmetrically. Accordingly, the same amount of inward deflection occurring at the fastener ends of the retaining member is also produced at the hinged ends of the retaining member.

These problems have led to the development of numerous other types of V-pipe coupling. However, many of these new designs are difficult to manufacture. Moreover, these new designs are often more expensive and complicated to use. One example of a relatively new design is disclosed in U.S. Pat. No. 4,919,453 to Halling et al. While this V-coupling performs quite well, the latch mechanism is more expensive than more conventional latch mechanisms.

Examples of some prior couplings are disclosed in U.S. Pat. Nos. 1,966,039 to Muchnic; 3,575,432 to Taylor; and 3,797,836 to Halling; French Patent No. 1,403,430 to Avia Equipment Ltd.; and British Patent Nos. 1,126,872 to Ward et al; and 1,140,636 to Brownhill et al.

In view of the above, it will be apparent to those skilled in the art that there exists a need for a pipe coupling device that is compact and lightweight, and that improves manufacturability of pipe coupling devices. This invention addresses the above needs as well as other needs which will become apparent to those skilled in the art once given this disclosure.

SUMMARY OF THE INVENTION

One object of the present invention is to provide a pipe coupling device which is compact and lightweight.

Another object of the invention is to provide a coupling device that is relatively easy to assemble, reliable, and relatively simple to make.

Another object of the invention is to provide a pipe coupling device which causes less flange deformation due to geometry of coupling.

Another object of the invention is to provide a pipe coupling having all components positively retained together.

The foregoing objects are basically attained by providing a pipe coupling device for releasably coupling a pair of pipes with peripheral end flanges together, comprising a first arcuate retainer including a first end with a first pivot point adjacent thereto, a second end with a first coupling surface adjacent thereto, and a first gripping groove with an inner gripping surface extending between the first and second ends for receiving a first portion of each of the peripheral end flanges of the pipes therein; a second arcuate retainer including a first end with a second pivot point adjacent thereto, a second end with a second coupling surface adjacent thereto, and a second gripping groove with an inner gripping surface extending between the first and second ends of the second arcuate retainer for receiving a second portion of each of the peripheral end flanges of the pipes therein; a hinge pivotally coupling the first ends of the first and second retainers together; and a latch releasably coupling the second end of the second retainer to the second end of the first retainer, the latch including a first coupling member having a first tenon for engaging the first coupling surface, and a first fastener hole extending therethrough, a second coupling member having a second tenon for engaging the second coupling slot to be retained therein and a second fastener hole extending therethrough, a threaded fastener having a head for engaging one of the coupling members and a threaded shaft received in the fastener holes of the first and second coupling members to releasably couple the second ends of the retainers together, and a nut threadedly engaging the shaft of the fastener.

The foregoing objects are also basically attained by providing a pipe coupling device for releasably coupling a pair of pipes with peripheral end flanges together, comprising: a first arcuate retainer including a first end with a first pivot slot, a second end, and a first gripping groove with an inner gripping surface extending between the first and second ends for receiving a portion of each of the peripheral end flanges of the pipes therein, the first pivot slot having a first curved coupling surface extending through an arc greater than 180° and less than 360°; a second arcuate retainer including a first end with a second pivot slot, a second end, and a second gripping groove with an inner gripping surface extending between the first and second ends of the second arcuate retainer for receiving a portion of each of the peripheral end flanges of the pipes therein, the second pivot slot having a second curved surface extending through an arc greater than 180° and less than 360°; a hinge including a first link and a second link with each of said links being pivotally coupled to the retainers adjacent the first ends of the retainers by first and second pivot pins respectively; and a latch releasably coupling the second end of the first retainer to the second end of the second retainer.

The foregoing objects are also attained by a pipe coupling device for releasably coupling a pair of pipes with peripheral end flanges together, comprising: a first arcuate retainer including a first end with a first pivot point, a second end having a first coupling slot with a first curved coupling surface, and a first gripping groove with an inner gripping surface extending between the first and second ends for receiving a first portion of each of the peripheral end flanges of the pipes therein; a second arcuate retainer including a first end with a second pivot point, a second end having a second coupling slot with a second coupling surface with an opening to form a mortise, and a second gripping groove with an inner gripping surface extending between the first and second ends of the second arcuate retainer for receiving a second portion of each of the peripheral end flanges of the pipes therein; a hinge pivotally coupling the first ends of the first and second retainers together; and a latch releasably coupling the second end of the second retainer to the second end of the first retainer, said latch including a first coupling member with a first tenon for engaging the first coupling slot, a second coupling member with a second tenon for engaging the second coupling slot and being retained therein, and a fastener operatively coupled between the first and second coupling members to releasably couple the second ends of the retainers together.

The foregoing objects are also attained by a pipe coupling retainer for a V-pipe coupling device which axially couples together a pair of pipes having peripheral end flanges with a pair of oppositely slanted contact surfaces, the slanted contact surfaces of the flanges having an annular, outer envelope, the retainer comprising an arcuate bight portion including a first end, a second end, and an inner connecting surface extending along an arc between the first and second ends of the bight portion; a first arcuate leg portion integrally form with the bight portion, and including a first inner surface extending from the connecting surface of the bight portion, the first inner surface having a first slanted gripping surface for engaging one of the contact surfaces of the flanges of the pipes and a first non-gripping surface extending between the first gripping surface and the connecting surface; and a second arcuate leg portion integrally form with the bight portion, and including a second inner surface extending from the connecting surface of the bight portion such that the first and second inner surfaces together with the connecting surface form an arcuate groove for receiving portions of the flanges of the pipes being joined together, the second inner surface having a second slanted gripping surface for engaging the other contact surface of the flanges of the pipes and a second non-gripping surface extending between the second gripping surface and the connecting surface, the gripping surfaces being spaced apart by a distance causing at least a portion of each of the first and second non-gripping surfaces being positioned radially inwardly from the outer envelope of the contact surfaces of the flanges of the pipes and oriented out of contact with the contact surfaces of the flanges of the pipes.

In some embodiments, the latch assembly employs a "snap-fit" to releasably hold the latch assembly in a closed position. The phrase "snap-fit" as used herein includes, but is not limited to, a structure in which two parts are either frictionally retained together or retained by elastically and/or plastically deforming one of the two parts.

In the preferred embodiments of the invention, the pipe coupling device has center lines of the links as close as possible to the area of greatest concentration of the forces applied to the peripheral flanges of the pipes by the coupling device, i.e., the circumferential loading line. Of course, it is not necessarily possible in all circumstances for center lines of the links to coincide with the circumferential loading line since the links would interfere with the pipes in some cases. Thus, the transverse width of the links limits the ability to have center lines of the links coinciding with the circumferential loading line. Moreover, in some circumstance where cost is a major factor, conventional links may be used instead of manufacturing special links which would optimize performance of the coupling.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form part of this original disclosure:

FIG. 3 is a bottom plan view of the pipe coupling device of FIGS. 1 and 2, illustrating the hinge assembly and the latch assembly coupled about the peripheral flanges of the pipes;

FIG. 4 is a bottom, side perspective view of the pipe coupling device of FIGS. 1–3, with the latch assembly uncoupled from the upper retainer;

FIG. 7 is a partially exploded perspective view of the pipe coupling device of FIGS. 1–6;

FIG. 8 is an enlarged side elevational view of the upper retainer for the pipe coupling device illustrated in FIGS. 1–7;

FIG. 9 is an enlarged side elevational view of the lower retainer for the pipe coupling device illustrated in FIGS. 1–7;

FIG. 18 is an enlarged, perspective view of the fail-safe link coupled to the two coupling members or blocks for the pipe coupling device of FIGS. 1–7;

FIG. 19 is a perspective view of the fail-safe link illustrated in FIG. 18 with the coupling members or blocks removed;

FIG. 20 is a side perspective view of the fail-safe link illustrated in FIGS. 18 and 19 for the pipe coupling device of FIGS. 1–7;

FIG. 21 is a side elevational view of the fail-safe link illustrated in FIGS. 18–20 for the pipe coupling device of FIGS. 1–7;

FIG. 22 is a bottom end elevational view of the fail-safe link illustrated in FIGS. 18–21 for the pipe coupling device of FIGS. 1–7;

FIG. 23 is a side elevational view of a pipe coupling device in accordance with a second embodiment of the present invention;

FIG. 24 is a front end elevational view of the pipe coupling device of FIG. 23 in accordance with the second embodiment of the present invention;

FIG. 26 is a side elevational view of a pipe coupling device in accordance with a third embodiment of the present invention;

FIG. 27 is a front end elevational view of the pipe coupling device of FIG. 26 in accordance with a third embodiment of the present invention;

FIG. 29 is a side elevational view of a pipe coupling device in accordance with a fourth embodiment of the present invention;

FIG. 30 is a front end elevational view of the pipe coupling device of FIG. 29 in accordance with a fourth embodiment of the present invention;

FIG. 32 is a side elevational view of a pipe coupling device in accordance with a fifth embodiment of the present invention;

FIG. 33 is a front end elevational view of the pipe coupling device of FIG. 32 in accordance with a fifth embodiment of the present invention;

FIG. 36 is a side elevational view of a pipe coupling device with certain parts in cross section in accordance with a sixth embodiment of the present invention;

FIG. 37 is a front end elevational view of the pipe coupling device of FIG. 36 in accordance with a sixth embodiment of the present invention;

FIG. 40 is a rear elevational view of the cradle of the latch assembly illustrated in FIGS. 38 and 39 for the pipe coupling device of FIGS. 36 and 37 in accordance with a sixth embodiment of the present invention;

FIG. 41 is a side elevational view of the cradle illustrated in FIG. 40 for the pipe coupling device of FIGS. 36 and 37 in accordance with a sixth embodiment of the present invention;

FIG. 42 is a cross-sectional view of the cradle illustrated in FIGS. 40 and 41 taken along section line 42–42 of FIG. 40;

FIG. 43 is a bottom plan view of the cradle illustrated in FIGS. 40–42 for the pipe coupling device of FIGS. 36 and 37 in accordance with a sixth embodiment of the present invention;

FIG. 44 is a top plan view of the coupling member or block illustrated in FIGS. 38 and 39 for the pipe coupling device of FIGS. 36 and 37 in accordance with a sixth embodiment of the present invention; and FIG. 45 is a rear elevational view of the coupling member or block of FIG. 44 for the pipe coupling device of FIGS. 36 and 37 in accordance with the sixth embodiment of the present invention.

DETAILED DESCRIPTION OF THE INVENTION

Figure 2:
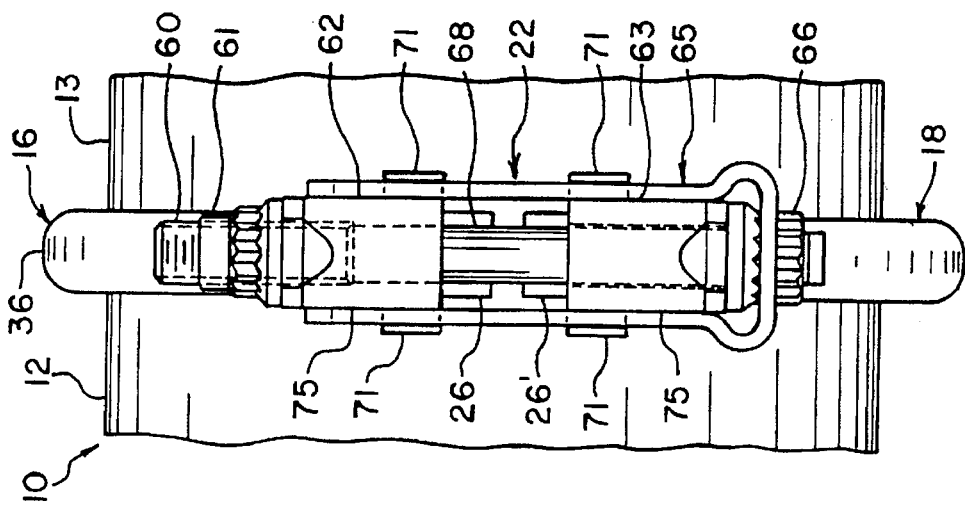
FIG. 2 is a front end elevational view of the pipe coupling device of FIG. 1, illustrating the latch assembly coupled about the peripheral flanges of the pipes.

Referring initially to FIGS. 1–11, a V-pipe coupling device 10 in accordance with a first embodiment of the present invention is illustrated for connecting and fixedly coupling first and second coaxial pipes 12 and 13 together by their peripheral flanges 14 and 15, respectively. Pipe coupling device 10 includes a first or upper retainer 16 for engaging first contact surfaces of peripheral flanges 14 and 15 of pipes 12 and 14, a second or lower retainer 18 for engaging second contact surfaces of peripheral flanges 14 and 15 of pipes 12 and 14, a hinge assembly 20 for coupling one of the ends of retainers 16 and 18 together, and a latch assembly 22 for releasably coupling the other ends of retainers 16 and 18 together.

Pipe coupling device 10 is designed to decrease distortion of the pipes 12 and 13, or any other component coupled to pipes 12 and 13, from the moments produced by hinge assembly 20 and latch assembly 22. Specifically, hinge assembly 20 and latch assembly 22 are designed to reduce the amount of offset of their moments from the circumferential loading line of the retainers 16 and 18 to minimize distortion of the pipes 12 and 13. In other words, the resultant moments produced by hinge assembly 20 is closer to the coupling force (circumferential loading line) of retainers 16 and 18 on the pipes 12 and 14. This arrangement minimizes the inward rotation of the ends of retainers 16 and 18, i.e., reduces local deflection of the pipes 12 and 14 by the ends of retainers 16 and 18. Moreover, the coupling points of hinge assembly 20 and latch assembly 22 are spaced from the ends of retainers 16 and 18 to create lever arms, which also reduce localized deflection of the ends of retainers 16 and 18. This arrangement is more fully descried in U.S. Pat. No. 5,509,702, issued Apr. 23, 1996, which is hereby incorporated by reference.

Figure 1:
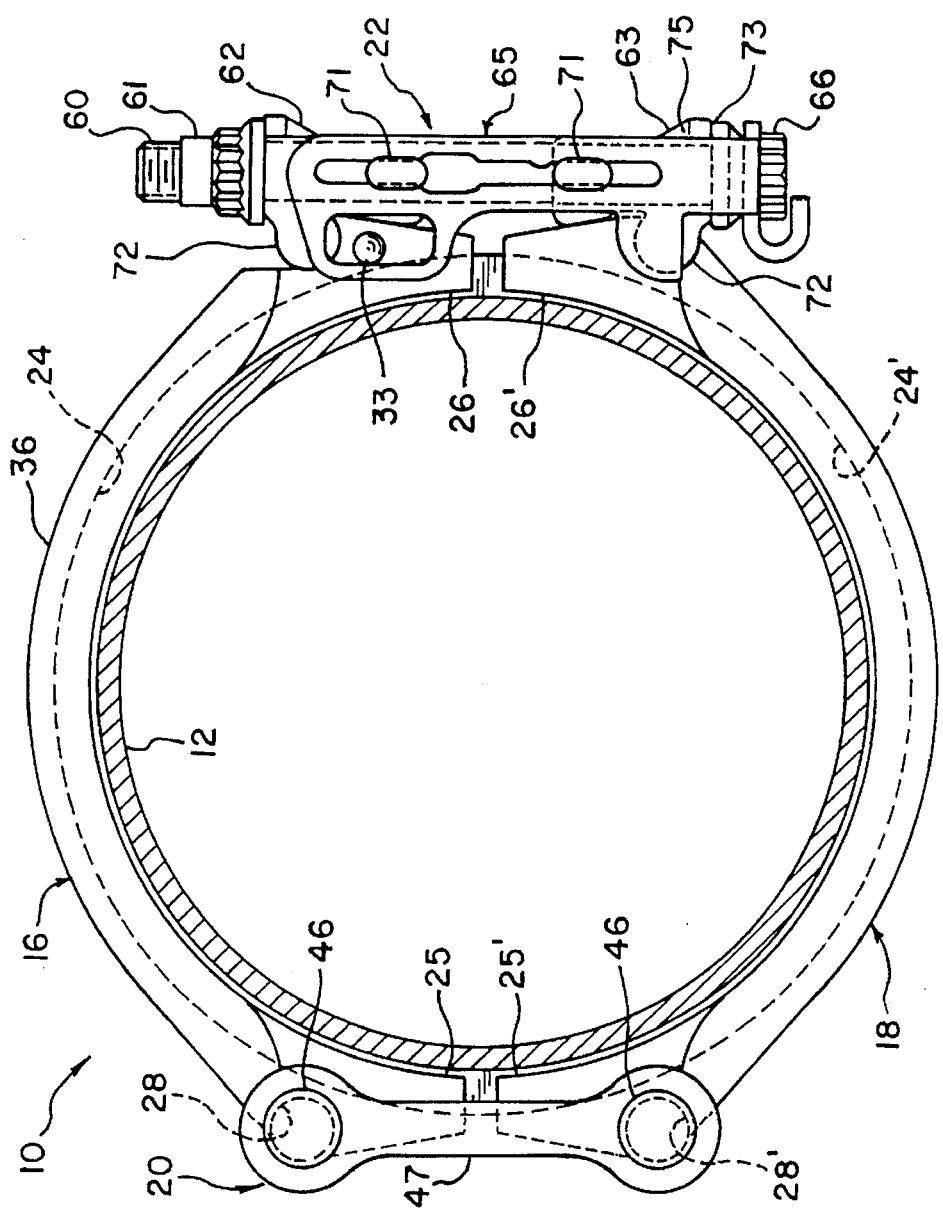
FIG. 1 is a side elevational view of a pipe coupling device in accordance with a first embodiment of the present invention coupled about the peripheral flanges of a pair of coaxial pipes.
Figure 5:
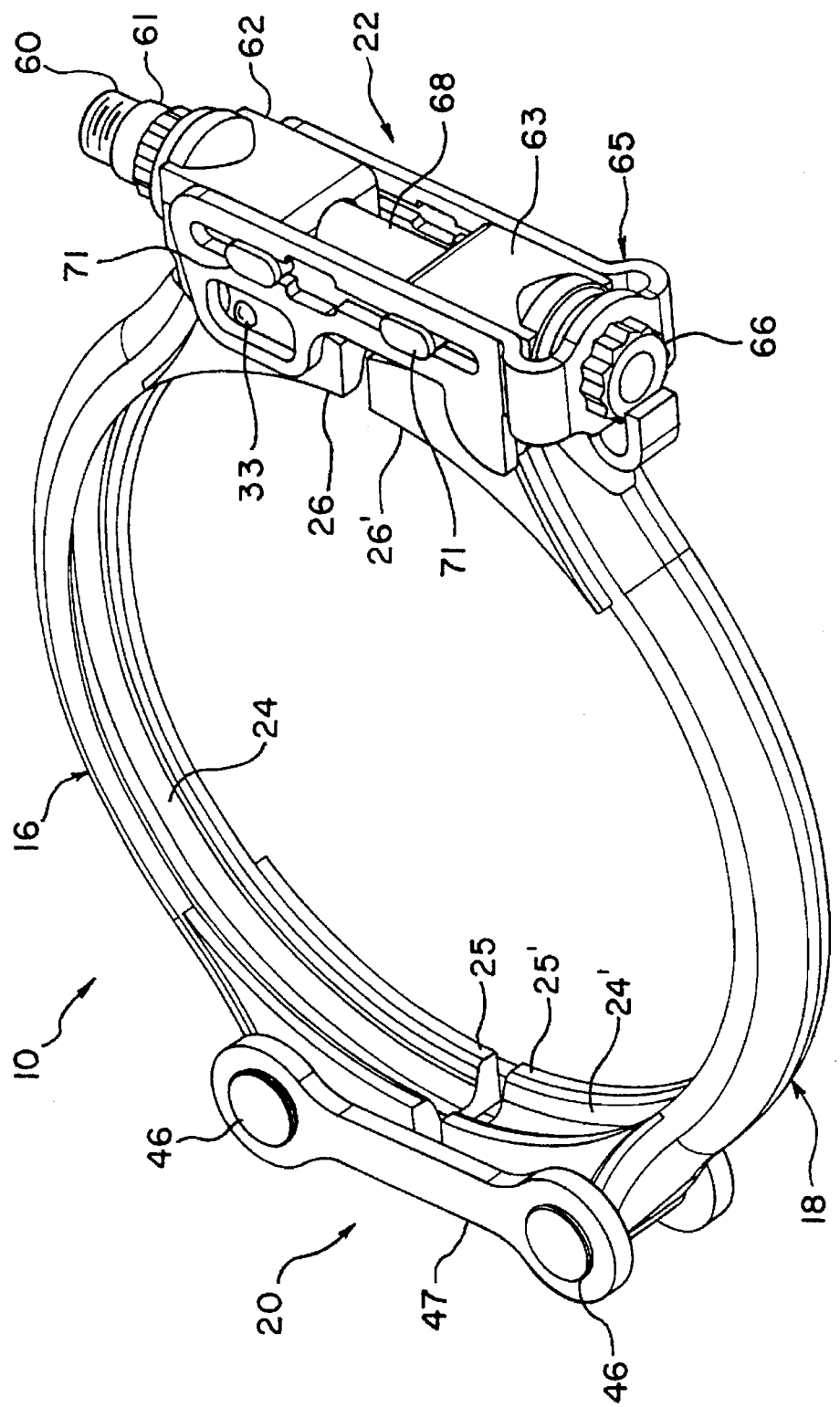
FIG. 5 is a bottom, side perspective view of the pipe coupling device of FIGS. 1–4, with the latch assembly in the closed and fully tightened position.
Figure 6:
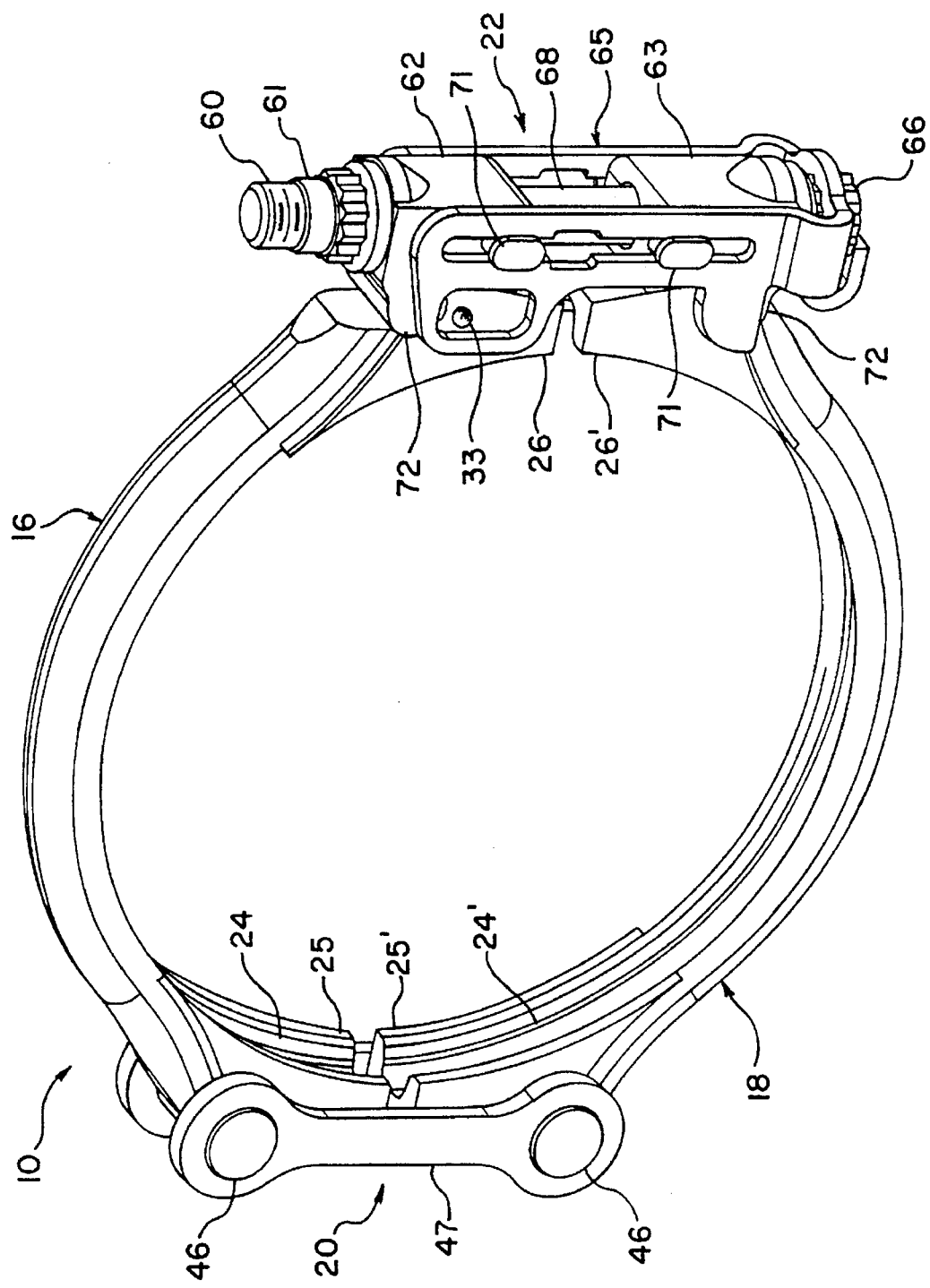
FIG. 6 is a top, side perspective view of the pipe coupling device of FIGS. 1–5, with the latch assembly in a closed and fully tightened position.
Figure 11:
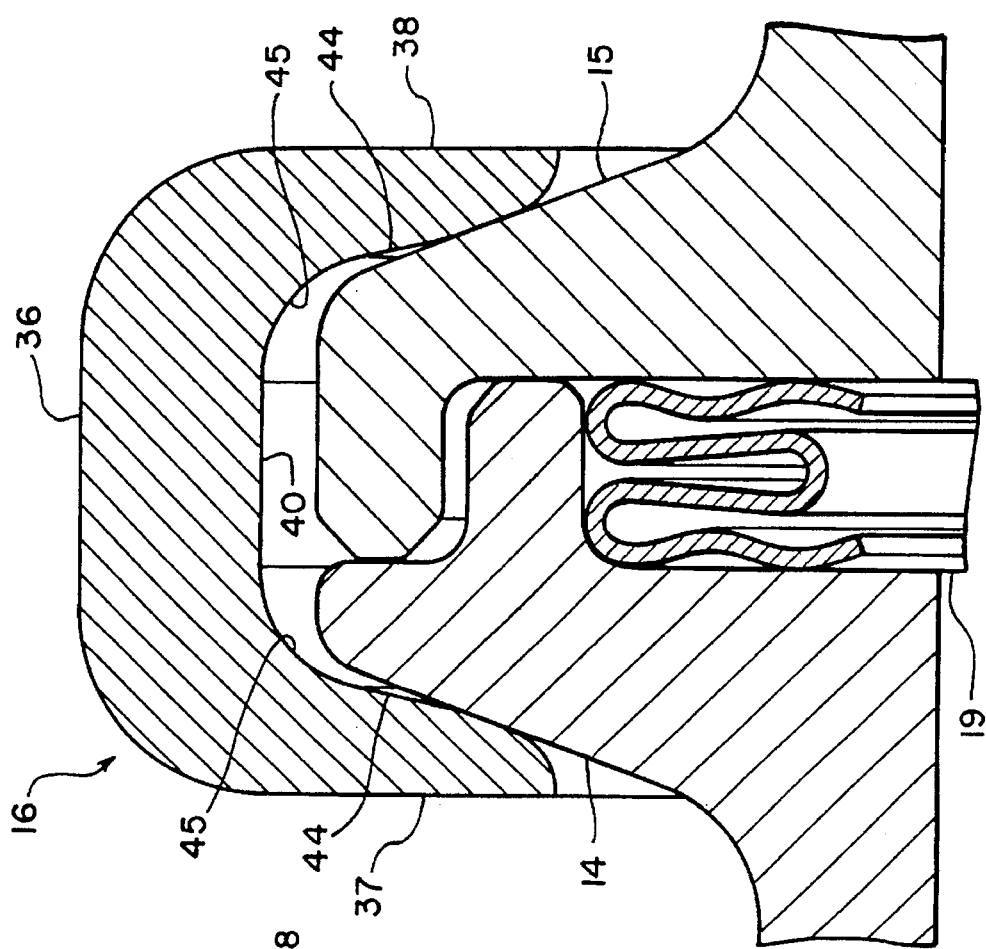
FIG. 11 is an enlarged, partial cross-sectional view of the upper retainer illustrated in FIG. 10 coupled about the peripheral flanges of the pipes.

As seen in FIGS. 1, 2 and 11, pipes 12 and 13 are conventional pipes, tubes or conduits with peripheral end flanges 14 and 15, respectively, which are engaged by retainers 16 and 18 for coupling pipes 12 and 14 together. In particular, flanges 14 and 15 have tapered contact surfaces so that upon tightening retainers 16 and 18 therebetween, the flanges 14 and 15 are forced together. An E-shaped seal 19 is positioned between peripheral flanges 14 and 15 of pipes 12 and 13 for sealing the connection therebetween as seen in FIG. 11. Since pipe coupling device 10 can be designed for most flanged pipes, the details of pipes 12 and 13 will not be discussed or illustrated in detail herein.

Referring now to FIGS. 7–11, first retainer 16 is an arcuate retaining member having a substantially V-shaped gripping groove 24 extending from a first end 25 of retainer 16 to a second end 26 of retainer 16. Preferably, the arc extending between first end 25 and second end 26 of retainer 16 is approximately 180°. Retainer 16 is preferably integrally formed as a one-piece, unitary member constructed out of a suitable metallic material typically used in the pipe coupling art, such as INCONEL 718, stainless steel or any other suitable material.

An open pivot hole or slot 28 is formed in first retainer 16 adjacent its first end 25 for pivotally attaching one end of hinge assembly 20 thereto, as discussed below. Pivot slot 28 is spaced from first end 25 about the circumference of retainer 16 to form a lever arm 29 therebetween to counteract the inward force resulting from hinge assembly 20 of retainer 16 on peripheral flanges 14 and 15 of pipes 12 and 13. In other words, the moment resulting from hinge assembly 20 produces an inwardly directed force which is greatest at pivot slot 28 of retainer 16. This inwardly directed force is transmitted to lever arm 29 of retainer 16 so that the inwardly directed force of the moment is spread out from the point of pivot slot 28 along lever arm 29. This results in a more even distribution of the moment produced by hinge assembly 20 along retainer 16. Pivot slot 28 is also formed as close as possible to the inner surface of gripping groove 24 so that hinge assembly 20 straddles flanges 14 and 15 of pipes 12 and 13 as discussed below.

Pivot slot 28 has a curved coupling surface 30 extending through an arc of approximately 235° to approximately 250° for securely retaining hinge assembly 20 thereto. Of course, curved coupling surface 30 can extend through an arc of 360°, i.e., to form a closed pivot hole or slot, if desired as discussed in one of the later embodiments of the present invention. However, to minimize weight, pivot slot 28 is preferably an open hole with curved coupling surface 30 extending through an arc greater than 180° and less than 360° to pivotally retain latch assembly 20 to first retainer 16 as discussed below. Moreover, an open hole for pivot slot 28 minimizes the size of the bar stock needed to manufacture retainer 16.

A coupling slot 32 is formed in first retainer 16 adjacent its second end 26 for releasably coupling latch assembly 22 thereto as discussed below. Coupling hole 32 has a curved coupling surface 34 for releasably engaging latch assembly 22. In this embodiment, coupling slot 32 is an open coupling hole such that coupling surface 34 extends through an arc less than 360°. Moreover, coupling surface 34 preferably extends through an arc of less than approximately 180° so that a portion of latch assembly 22, as discussed below, is releasably retained in coupling slot 32. Preferably, coupling surface 34 of coupling slot 32 extends through an arc of approximately 115° to approximately 140°.

Coupling slot 32 is spaced from second end 26 about the circumference of retainer 16 to form a lever arm 35 therebetween to counteract the inward force resulting from latch assembly 22 on retainer 16. In other words, the portion of retainer 16 between coupling slot 32 and second end 26 of retainer 16 acts as lever arm 35 for engaging flanges 14 and 15 of pipes 12 and 13 to more uniformly distribute the load resulting from the moment induced rotation of retainer 16 by latch assembly 22.

This reduction of the inward loads at ends 25 and 26 of retainer 16 by lever arms 29 and 35 decreases the distortion of the flanges 14 and 15 of pipes 12 and 13. Accordingly, coupling device 10 can be tightened with a higher torque to apply a higher circumferential coupling force on flanges 14 and 15 of pipes 12 and 13 without distortion thereof.

As seen in FIGS. 1, 4–6 and 8, a semi-spherical protrusion or detent 33 extends from each side of retainer 16 adjacent its second end 26. Protrusions or detents 33 are preferably the heads of hammer drive screws, which are fixedly and rigidly coupled to retainer 16. Protrusions 33 act as detents for retaining latch assembly 22 in correct alignment with retainer 16.

Figure 10:
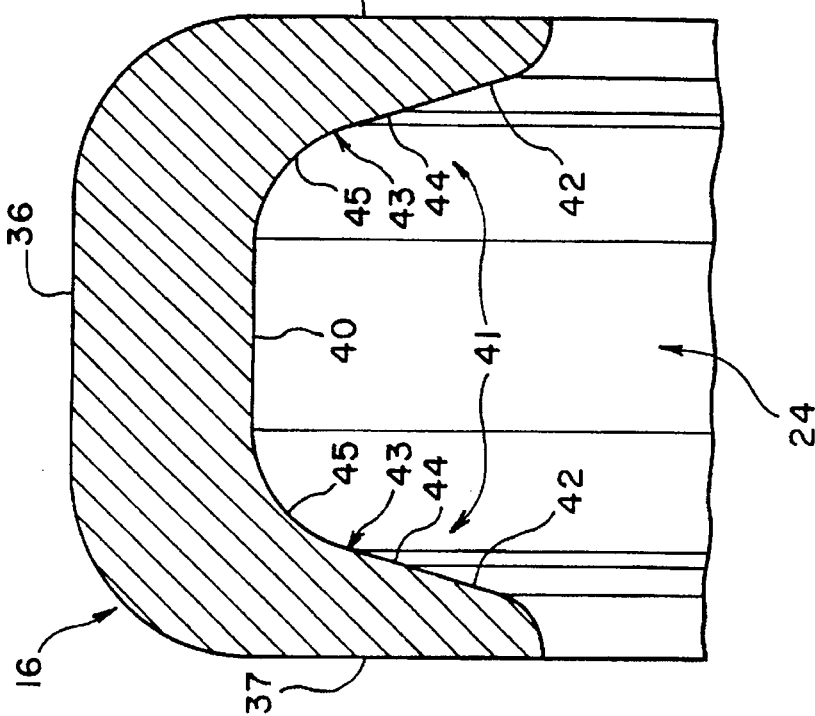
FIG. 10 is an enlarged, partial cross-sectional view of the upper retainer taken along section line 10—10 of FIG. 8 of the coupling device of FIGS. 1–7.

Referring now to FIGS. 10 and 11, gripping groove 24 of retainer 16 has a unique cross-sectional profile, which is formed by an arcuate bight portion 36 extending between its first and second ends 25 and 26, a first arcuate leg portion 37 integrally formed with arcuate bight portion 36, and a second arcuate leg portion 38 also integrally formed with arcuate bight portion 36. Arcuate bight portion 36 has an inner connecting surface 40 extending along an arc between first and second ends 25 and 26 of retainer 16.

First and second arcuate leg portions 37 and 38 are substantially identical to each other, except that they are mirror images of each other. Accordingly, identical reference numerals will be used to identify substantially identical parts or portions of leg portions 37 and 38. First and second arcuate leg portions 37 and 38 each have an inner surface 41 extending from connecting surface 40 of bight portion 36. Each of the inner surfaces 41 of arcuate leg portions 37 and 38 has a slanted gripping surface 42 for engaging the contact surface of one of the flanges 14 or 15 of pipes 12 or 13, and a non-gripping surface 43 extending between the slanted gripping surfaces 42 and connecting surface 40 of bight portion 36.

Slanted gripping surfaces 42 converge towards each other as they extend outwardly from the center of pipes 12 and 13, and are sloped to correspond to the slope of the contact surfaces of flanges 14 and 15 of pipes 12 and 13 to firmly engage thereto. In other words, upon tightening latch assembly 22, slanted gripping surfaces 42 engage the contact surfaces of peripheral end flanges 14 and 15 of pipes 12 and 13 to securely couple pipes 12 and 13 together.

Each of the non-gripping surfaces 43 preferably includes a planar portion 44 and a curved portion 45. Planar portions 44 of each of the non-gripping surfaces 43 have a steeper slope than the slope of slanted gripping surfaces 42 such that planar portions 44 are angled away from flanges 14 and 15 of pipes 12 and 13. For example, slanted gripping surfaces 42 can be provided with a slope of approximately 19.375° with respect to a plane extending perpendicular to the longitudinal axes of pipes 12 and 13. Planar portions 44, on the other hand, can be provided with a slope of approximately 3° with respect to a plane extending perpendicular to the longitudinal axes of pipes 12 and 13. Accordingly, planar portions 44 of non-gripping surfaces 43 will not engage peripheral flanges 14 and 15 of pipes 12 and 13. However, the spacing between slanted gripping surfaces 42 of leg portions 37 and 38 is such that the outer envelope of flanges 14 and 15 of pipes 12 and 13 extends beyond slanted gripping surfaces 42 and adjacent to non-gripping surfaces 43. Stated differently, portions of non-gripping surfaces 43 are within the outer envelope of the contact surfaces of peripheral flanges 14 and 15. Preferably, planar portions 44 of non-gripping surfaces 43 are completely within the outer envelope of pipes 12 and 13.

Curved portions 45 of non-gripping surfaces 43 extend between contacting surface 40 and planar portions 44, respectively. Preferably, each of the curved portions 45 also has a portion of its surface within the outer envelope of the contact surfaces of flanges 14 and 15 of pipes 12 and 13. Curved portions 45 of non-gripping surfaces 43 have a larger radius than the corresponding section of prior art retainer 16a. These larger radii of curved portions 45 lower the stress within retainer 16 so that the cross-sectional dimensions of the retainer can be reduced as well as the weight of retainer 16 can be reduced. In other words, retainer 16 for a given cross-sectional weight has a lower stress than prior art retainer 16a. Preferably, radii of curved portions 45 are in the range from approximately 0.065 inch to approximately 0.085 inch, with 0.75 inch being most preferable as shown.

Alternatively, the profile of gripping groove 24 can be modified from the profile as shown. For example, planar portions 44 of non-gripping surfaces 43 could be eliminated such that curved portions 45 could be extended to gripping surfaces 42. Of course, it is important to use a larger radius for each of the curved portions 45 to lower the stress within retainer 16.

Figure 13:
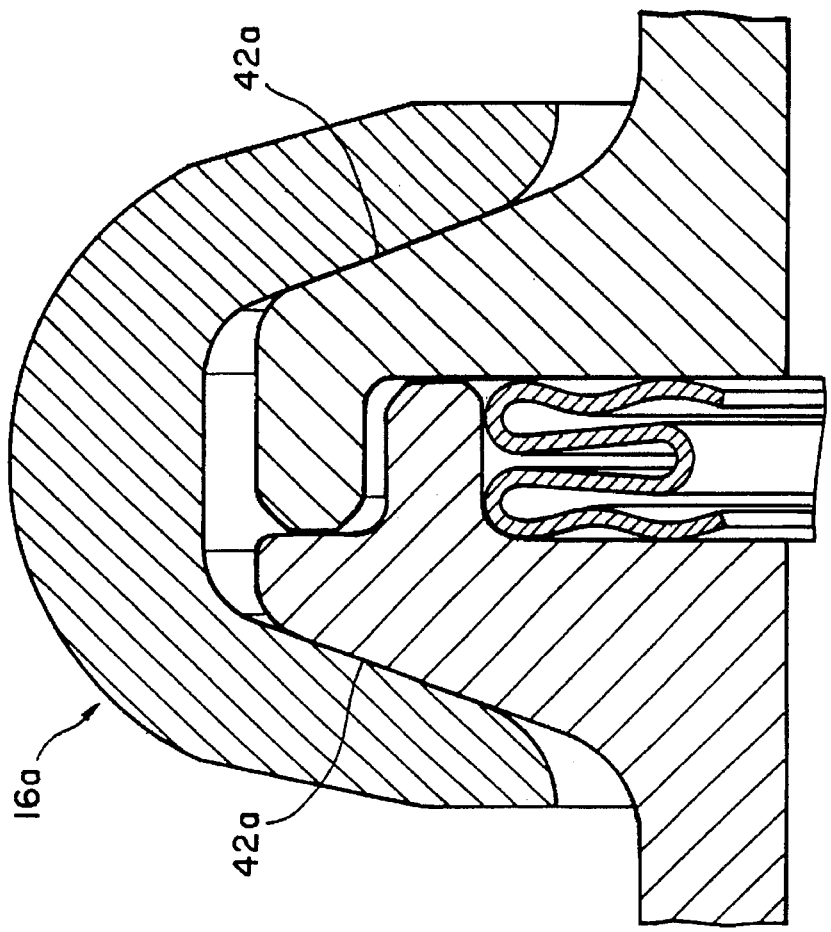
FIG. 13 is an enlarged, partial cross-sectional view of the prior art retainer illustrated in FIG. 12 coupled about the peripheral flanges of a pair of coaxial pipes.
Figure 12:
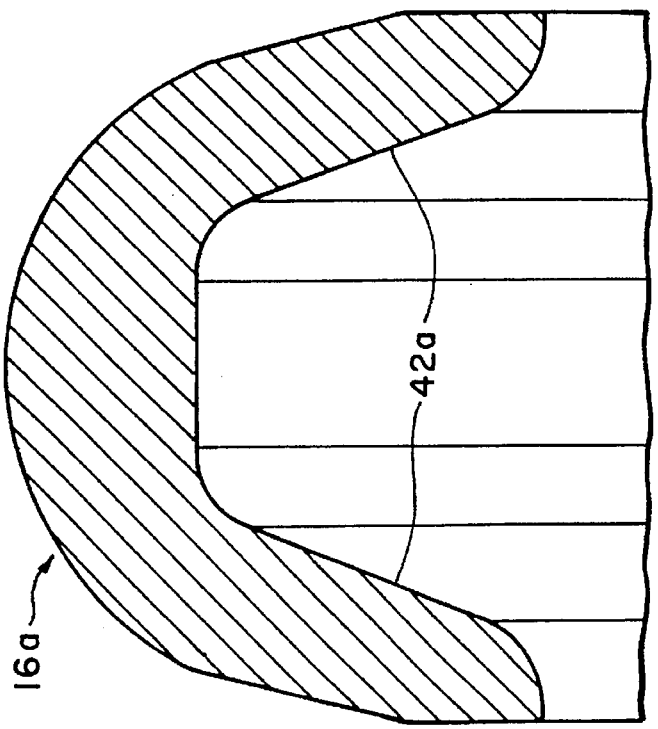
FIG. 12 is an enlarged, partial cross-sectional view of a prior art retainer from a pipe coupling device utilized to couple a pair of coaxial pipes together.
Figure 17:
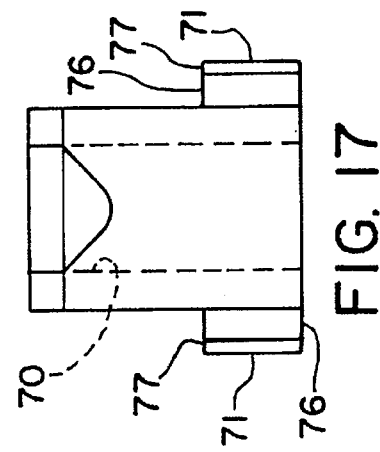
FIG. 17 is a front elevational view of the coupling member or block illustrated in FIGS. 15 and 16 for the pipe coupling device of FIGS. 1–7.
Figure 15:
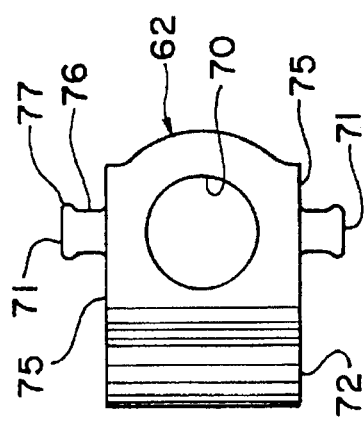
FIG. 15 is a top plan view of one of the coupling members or blocks illustrated in FIG. 14 for the coupling device of FIGS. 1–7.
Figure 16:
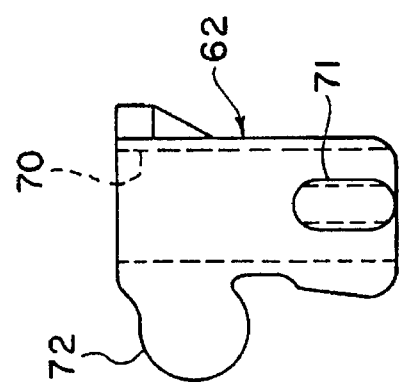
FIG. 16 is a side elevational view of the coupling member or block illustrated in FIG. 15 for the coupling device of FIGS. 1–7.
Figure 14:
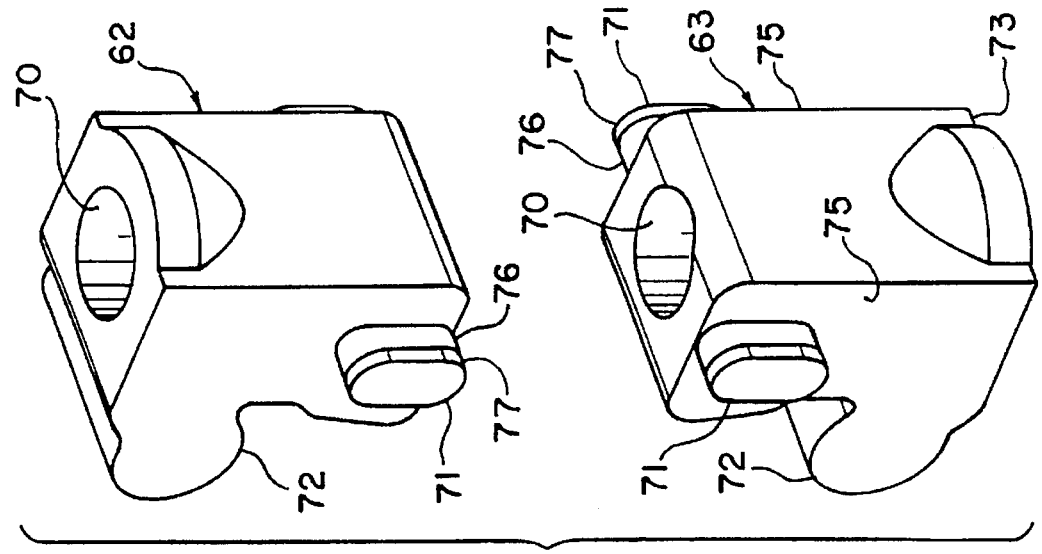
FIG. 14 is an enlarged, exploded perspective view of the coupling members or blocks for the pipe coupling device illustrated in FIGS. 1–7.

Referring now to FIGS. 12 and 13, a cross-sectional view of a prior art retainer 16a is illustrated in partial cross section by itself and in partial cross section coupled on the peripheral flanges 14 and 15 of pipes 12 and 13. As can readily be seen by comparing the cross-sectional profiles of the prior art retainer 16a to the retainer 16 of the present invention illustrated in FIGS. 10 and 11, retainer 16 of the present invention is more compact and lightweight than prior art retainer 16a, and has a lower profile than prior art retainer 16a.

As seen in FIGS. 12 and 13, the gripping surfaces 42a of prior art retainer 16a extend past the outer envelope of the contact surfaces of flanges 14 and 15 of pipes 12 and 13. Moreover, the dimensions of prior art retainer 16a have a greater thickness along its bight portion and its leg portions than retainer 16 of the present invention for the same application.

Specifically, retainer 16 has an outer width between leg portions 37 and 38 of about 0.320 inch, while prior art retainer 16a has a width of 0.350 inch. Retainer 16 has a height between the outer surface of connecting portion 36 and the bottoms of leg portions 37 and 38 of about 0.240 inch with a connecting portion 36 being about 0.090 inch thick, while prior art retainer 16a has a height of about 0.292 inch, with the thickness of the connecting portion being about 0.110 inch thick. The outer curvature between the leg portions and connecting portion is preferably about 0.125 inch for both retainer 16 and retainer 16a. Accordingly, prior art retainer 16a is not as preferable as retainer 16 of the present invention in applications requiring parts to be as lightweight as possible.

Second or lower retainer 18 is substantially identical to first or upper retainer 16, except that its connection to latch assembly 22 has been slightly modified. Accordingly, like reference numerals with primes will be used to indicate portions of retainer 18 which are similar to retainer 16. In view of the similarities between retainers 16 and 18, retainer 18 will not be discussed in detail herein.

Basically, retainer 18 has a gripping groove 24' extending from a first end 25' to a second end 26'. First end 25' has an open pivot hole or slot 28', while second end 26' has an open coupling hole or slot 32'. Pivot slot 28' and coupling slot 32' have coupling surfaces 30' and 34', respectively, which preferably extend through an arc greater than 180° and less than 360° for retaining either a portion of hinge assembly 20 or latch assembly 22 therein.

Referring again to FIGS. 1–7, hinge assembly 20 includes a pair of pivot pins 46 and a pair of links 47 for pivotally coupling first ends of retainers 16 and 18 together. Pivot pins 46 are in the form of rivets which are deformed at one end for securing links 47 to retainers 16 and 18. Specifically, as seen in FIG. 7, links 47 each have a first pivot hole 48 at one end for receiving one of the pivot pins 46 therein, and a second pivot hole 49 at its other end for receiving the other pivot pin 46 therein. Pivot pins 46 are received in pivot slots 28 and 28' of retainers 16 and 18, respectively.

Links 47 are dog-bone shaped links constructed of any suitable material used in the pipe coupling field in which the pipe coupling device will be used. For example, links 47 can be made of INCONEL 718 or any suitable stainless steel. It will be apparent to those skilled in the art from this disclosure that a plurality of links can be used, depending on the size of the links needed and/or desired.

Links 47 straddle peripheral flanges 14 and 15 of pipes 12 and 13 so that the moment produced by links 47 is moved inwardly towards the circumferential loading line of the retainers 16 and 18. In other words, the center line passing through the center of pivot pins 46 is moved inwardly towards peripheral flanges 14 and 15 of pipes 12 and 13 to reduce the bending moment induced on the ends 25 and 25' of retainers 16 and 18.

Ideally, this center line of links 47 should be moved as close as possible to the circumferential loading line of retainers 16 and 18 as practical based on the required transverse width of links 47. Stated differently, links 47 are moved in as close as possible to pipes 12 and 13 without actually engaging pipes 12 or 13. Of course, the practical limit to this inward movement of the center lines of links 47 is limited by the transverse width of the dog-bone links 47 at their center points.

Latch mechanism 22 is coupled to second ends 26 and 26' of retainers 16 and 18, and includes a fastener or tension bolt 60, a nut 61, a pair of coupling members or blocks 62 and 63, and a substantially U-shaped fail-safe link 65.

Tension bolt 60 has a head 66 with a non-circular shape and a partially threaded shaft 68. Tension bolt 60 is preferably substantially parallel to link 47 of hinge assembly 20 when pipe coupling device 10 is securely coupled about peripheral end flanges 14 and 15 of pipes 12 and 13. Nut 61 is adapted to be threaded onto shaft 68 of bolt 60 for releasably coupling second ends 26 and 26' of retainers 16 and 18 together. Tension bolt 60 and nut 61 are preferably constructed out of a conventional metallic material such as INCONEL 718, stainless steel or any other suitable high strength material.

As seen in FIGS. 14–17, coupling members or blocks 62 are preferably substantially identical, except that coupling block 63 faces in the opposite direction of coupling block 62. Accordingly, like reference numerals will be given to each of the coupling blocks 62 and 63. Coupling blocks 62 and 63 are preferably integrally formed as a one-piece, unitary member. Coupling blocks 62 and 63 are preferably casted out of INCONEL 718. However, any suitable manufacturing process and/or material can be utilized to construct coupling blocks 62 and 63.

Each of the coupling blocks 62 and 63 includes a fastener hole 70 for receiving shaft 68 of tension bolt 60 therethrough, a pair of headed members or detents 71 for retaining fail-safe link 65 thereto, and a tenon 72 extending therefrom for being received in either coupling slot 32 or 32' of retainers 16 or 18.

Fastener holes 70 of coupling blocks 62 and 63 are sized slightly larger than the diameter of tension bolt shaft 68 so that shaft 68 can freely slide within fastener holes 70. Preferably, bolt 60 extends through holes 70 of coupling blocks 62 and 63 so that head 66 of bolt 60 engages end 73 of block 63 and the threaded portion of shaft 68 extends out of hole 70 of coupling block 62 past end 74 of block 62 so that nut 61 can be threaded onto shaft 68.

Detents or headed members 71 extend in opposite directions from the sides 75 of coupling blocks 62 and 63, and each include a base portion 76 and a head portion 77 such that a portion of fail-safe link 65 is retained by headed members 71 on coupling blocks 62 and 63.

Tenon 72 has a curved outer surface forming a part of a cylinder which is received in either coupling slot 32 or 32' of retainers 16 or 18. Preferably, the curved outer surface of tenon 72 extends approximately 230° to 255°. It will be apparent from those skilled in the art from this disclosure that tenons 72 of blocks 62 and 63 can be constructed of a variety of shapes. In particular, a variety of tenon and mortise shapes can be utilized for tenon 72 and coupling slot 32' to connect coupling block 63 to second end 26' of retainer 18. One aspect of the present invention is that coupling block 63 can be securely retained to retainer 18 by sliding tenon 72 of coupling block 63 into coupling slot 32'. In other words, retainers 16 and 18 are lugless due to the use of coupling blocks 62 and 63.

Referring now to FIGS. 18–22, fail-safe link 65 includes a bight portion 80, a first leg portion 81 and a second leg portion 82. Bight portion 80 has a non-circular shaped hole 83 having a shape corresponding to the shape of head 66 of tension bolt 60 for receiving head 66 of tension bolt 60 therein. Accordingly, when head 66 of tension bolt 60 is received in hole 83 of bight portion 80, bolt 60 cannot rotate relative to fail-safe link 65. Bight portion 80 also includes a tab 84 bent such as to obstruct a tool from engaging head 66 of tension bolt 60 when latch assembly 22 is assembled.

Leg portions 81 and 82 are substantially identical, and each includes a longitudinally extending slot 85 for receiving headed members 71 therein, a retaining plate 86 for preventing coupling block 63 from sliding out of coupling slot 32', and a latch opening 87 for engaging protrusions or detents 33.

Slots 85 are preferably long enough so that latch assembly 22 can be completely assembled and freely swing from an unlatched position with tenon 72 of block 62 out of engagement with coupling slot 32 to a latched position with tenon 72 of block 62 engaging coupling slot 32. In the latched position, detents 33 engage latch openings 87 to hold latch assembly 22 in the latched position so that nut 61 can be rotated on bolt 60 to tighten pipe coupling device 10 about pipes 12 and 13.

Should bolt 60 fail, pipe coupling device 10 will not completely disengage from flanges 14 and 15 of pipes 12 and 13, since headed members 71 of coupling block 62 will engage the ends of slots 85 in fail-safe link 65 to prevent complete separation of the second ends 26 and 26' of retainers 16 and 18 from each other. Detents 33 also prevent latch assembly 22 from completely uncoupling from retainer 16 by engaging latch openings 87 in fail-safe link 65.

Each of the slots 85 has a cutout 88 and a bump 90. Cutouts 88 are offset from each other and sized for receiving head portion 77 of headed members 71 therein for installing coupling blocks 62 and 63 on fail-safe link 63. Accordingly, coupling blocks 62 and 63 are installed on fail-safe link 65 one at a time. First block 63 is installed by inserting one of the headed members 71 of coupling block 63 into cutout 88 in first leg portion 81 and then sliding coupling block 63 along slots 85 so that the other headed member 71 is now aligned with the other cutout 88 in the second leg portion 82. Now, coupling block 63 is slid along slots 85 past bumps 90 to retain block 63 within slots 85 of fail-safe link 65 by headed members 71. Bumps 90 limit the movement of block 63 along slots 85, since the widths of slots 85 at bumps 90 are smaller than the thickness of base portions 76 of headed members 71. Once block 63 is installed, block 62 is installed in the same manner, but in the opposite direction as explained below. Head portions 77 of headed members 71 are larger than the width of slots 85 to prevent disengagement, except for when the headed member 71 is aligned with the cutout 88 of slot 85. However, since the cutouts 88 are offset, the blocks 62 and 63 cannot easily fall out.

Retaining plates 86 are designed to overlap the end portions of tenon 72 of coupling block 63 and the end portions of coupling slot 32' to prevent axial movement of tenon 72 within coupling slot 32'. Accordingly, retaining plates 86 prevent coupling block 63 from being disengaged from retainer 18.

Latch openings 87 are designed to engage detents or protrusions 33 of retainer 16 via a snap-fit. Accordingly, latch assembly 22 after being installed around the peripheral flanges 14 and 15 of pipes 12 and 13, is pivoted such that latch openings 86 engage protrusions 33 via a snap-fit. This assists in the installation of pipe coupling device 10 about pipes 12 and 13 because this arrangement maintains the latch assembly 22 in position for tightening so that the operator does not need to hold the pipe coupling device together. Openings 86 are larger than detents 33 so that detents 33 stay within openings 86 before and after latch assembly 22 is tightened about pipes 12 and 13.

To assemble pipe coupling device 10 together, latch assembly 20 is installed on retainers 16 and 18 by inserting pivot pin 46 through pivot holes 48 and 49 of one of the links 47 and then through pivot slots 28 and 28' of retainers 16 and 18. Then, the other link 47 is installed onto the pivot pins 46 so that the two links 47 straddle the first ends 26 and 26' of retainers 16 and 18. Next, the ends of pivot pins 46 are deformed to retain pivot links 47 to retainers 16 and 18 such that retainers 16 and 18 pivot about pivot pins 46.

Latch assembly 22 is then installed on retainers 16 and 18 by first sliding tenon 72 of coupling block 63 into coupling slot 32' of retainer 18. Next, bolt 60 is inserted through fastener hole 70 of coupling block 63 such that head 66 of bolt 60 engages the end of coupling block 63. Now, fail-safe link 65 is installed onto coupling block 63 by inserting headed members 71 into slots 85 via cutouts 88. In this position, retaining plates 86 of fail-safe link 65 overlap a part of the interfaces of the ends of tenons 72 of block 63 and the ends of coupling slot 32' to prevent block 63 from disengaging coupling slot 32'. Once fail-safe link 65 is retained on coupling block 63 and retainer 18, coupling block 62 is installed on shaft 68 of tension bolt 60 such that shaft 68 extends through fastener hole 70 of block 62. Now, coupling block 62 is installed onto fail-safe link 65 by inserting detent 71 into slots 85 via cutouts 88. Finally, nut 61 is threaded onto shaft 68 of tension bolt 60 to complete the assembly of pipe coupling device 10.

Coupling device 10 is now ready to be installed onto peripheral end flanges 14 and 15 of pipes 12 and 13. Specifically, first and second retainer members 16 and 18 are placed about the butting peripheral end flanges 14 and 15 of pipes 12 and 13 so that a portion of the peripheral flanges 14 and 15 are received in gripping grooves 30 and 30' of retainers 16 and 18. In this position, the contact surfaces of peripheral flanges 14 and 15 engage gripping surfaces 42 and 42' of retainers 16 and 18, and one of links 47 is positioned on one side of peripheral flanges 14 and 15, while the other link 47 is positioned on the other side of peripheral flanges 14 and 15 to straddle peripheral flanges 14 and 15.

Now, latch assembly 22 is pivoted so that latch openings 87 engage detents 33 of retainer 16 and tenon 72 of coupling block 62 engages coupling surface 30 of retainer 16. In this position, latch assembly 22 is ready to be tightened. Accordingly, nut 61 is rotated on threaded shaft 68 of tension bolt 60 to tighten retainers 16 and 18 about peripheral flanges 14 and 15 of pipes 12 and 13. The pipe coupling device 10 is designed so that the distance between first ends 25 and 25' of retainers 16 and 18 is substantially equal to the distance between the second ends 26 and 26' of retainers 16 and 18 when properly tightened about pipes 12 and 13.

Removal of pipe coupling device 10 from pipes 12 and 13 is easily accomplished by untightening nut 61 and pivoting latch assembly 22 out of engagement with retainer 16.

Second Embodiment

Figure 25:
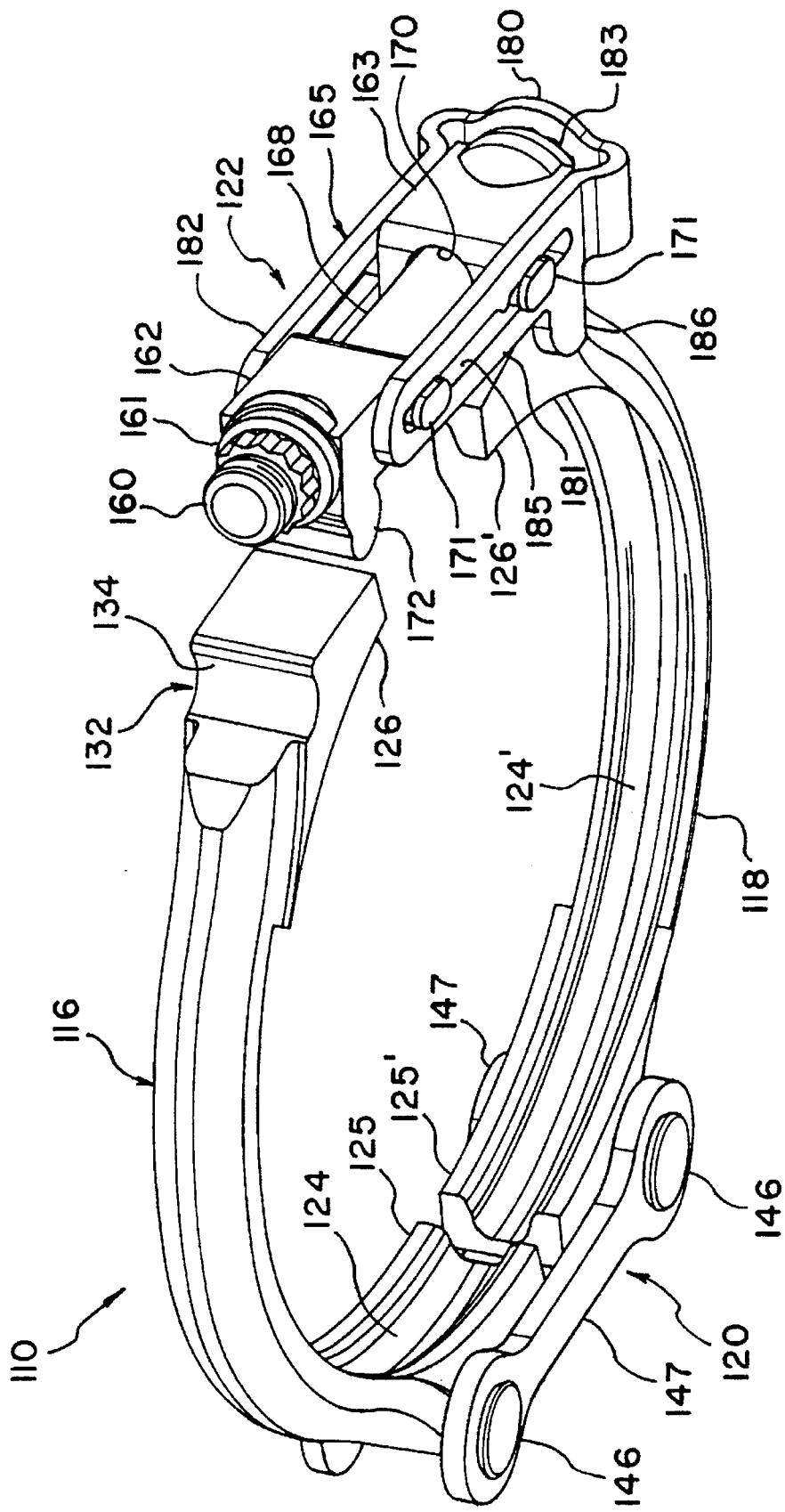
FIG. 25 is a top, side perspective view of the pipe coupling device of FIGS. 23 and 24 in accordance with a second embodiment of the present invention.

Referring now to FIGS. 23–25, a pipe coupling device 110 in accordance with a second embodiment of the present invention is illustrated, and includes a first retainer 116, a second retainer 118, a hinge assembly 120, and a latch assembly 122. This embodiment is substantially identical to the coupling device 10 of the first embodiment, except that protrusions 33 of retainer 16 and latching openings 86 of fail-safe link 65 of the first embodiment has been eliminated from pipe coupling device 110 of the second embodiment. Accordingly, pipe coupling device 110 of the second embodiment will not be illustrated or discussed in detail herein.

First retainer 116 is an arcuate retaining member having a substantially V-shaped gripping groove 124 extending from a first end 125 of retainer 116 to a second end 126 of retainer 116. Preferably, the arc extending between first end 125 and second end 126 of retainer 116 is approximately 180°.

First retainer 116 has an open pivot hole or pivot slot 128 adjacent its first end 125 for pivotally attaching one end of hinge assembly 120 thereto, and an open coupling hole or slot 132 adjacent its second end 126 for releasably coupling latch assembly 122 thereto as discussed below.

Pivot slot 128 has a curved coupling surface 130 extending through an arc of approximately 235° to approximately 250° for retaining hinge assembly 120 thereto. Of course, curved coupling surface 130 can extend through an arc of 360°, i.e., to form a closed pivot hole or slot, if desired as discussed in one of the later embodiments of the present invention. However, to minimize weight, pivot slot 128 is preferably an open hole with curved coupling surface 130 extending through an arc greater than 180° and less than 360° to pivotally retain latch assembly 120 to first retainer 116 as discussed below. Moreover, an open hole for pivot slot 128 minimizes the size of the bar stock needed to manufacture retainer 116.

In this embodiment, coupling slot 132 is an open coupling hole with a curved coupling surface 134 extending through an arc less than 360°. Moreover, coupling surface 134 preferably extends through an arc of less than approximately 180° so that a portion of latch assembly 122 is releasably retained in coupling slot 132. Preferably, coupling surface 134 of coupling slot 132 extends through an arc of approximately 115° to approximately 140°.

Second or lower retainer 118 is substantially identical to first or upper retainer 116, except that its connection to latch assembly 122 has been slightly modified. Accordingly, like reference numerals with primes will be used to indicate portions of retainer 118 which are similar to retainer 116. In view of the similarities between retainers 116 and 118, retainer 118 will not be discussed in detail herein.

Basically, retainer 118 has a gripping groove 124' extending from its first end 125' to its second end 126'. First end 125' has an open pivot hole or slot 128', while second end 126' has an open coupling hole or slot 132'. Pivot slot 128' and coupling slot 132' have coupling surfaces 130' and 134', respectively, which preferably extend through an arc greater than 180° and less than 360° for engaging and/or retaining a portion of hinge assembly 120 and latch assembly 122 therein.

Hinge assembly 120 includes a pair of pivot pins 146 and a pair of links 147 for pivotally coupling the first ends of retainers 116 and 118 together. Specifically, links 147 each have a first pivot hole 148 at one end for receiving one of the pivot pins 146 therein, and a second pivot hole 149 at its other end for receiving the other pivot pin 146 therein. Pivot pins 146 are received and pivotally retained in pivot slots 128 and 128' of retainers 116 and 118, respectively.

Latch mechanism 122 is coupled to second ends 126 and 126' of retainers 116 and 118, and includes a tension bolt 160, a nut 161, a pair of coupling members or blocks 162 and 163, and a substantially U-shaped fail-safe link 165. Tension bolt 160 has a head 166 with a non-circular shape and a threaded shaft 168 for threadedly receiving nut 161 to releasably couple second ends 126 and 126' of retainers 116 and 118 together. Coupling blocks 162 and 163 each include a fastener hole 170 for receiving shaft 168 of tension bolt 160 therethrough, a pair of headed members 171 for securing fail-safe link 165 thereto, and a tenon 172 extending therefrom for being received in either coupling slot 132 or 132' of retainers 116 or 118.

Fail-safe link 165 includes a bight portion 180, a first leg portion 181 and a second leg portion 182. Bight portion 180 has a non-circular shaped hole 183 having a shape corresponding to the shape of head 166 of tension bolt 160 for receiving head 166 of tension bolt 160 therein. Accordingly, when head 166 of tension bolt 160 is received in hole 183 of bight portion 180, bolt 160 cannot rotate relative to fail-safe link 165. Bight portion 180 also includes a tab 184 bent such as to obstruct a tool from engaging head 166 of tension bolt 160 when latch assembly 122 is assembled.

Leg portions 181 and 182 are substantially identical, and each includes a longitudinally extending slot 185 with a bump 190 for receiving headed members 171 therein, and a retaining plate 186 for preventing tenon 172 of coupling block 163 from sliding out of coupling slot 132'.

Slots 185 could be provided with cutout portions which are offset from each other and sized for receiving head portion 174 of detents 171 therein as in the prior embodiment if needed and/or desired.

Third Embodiment

Figure 28:
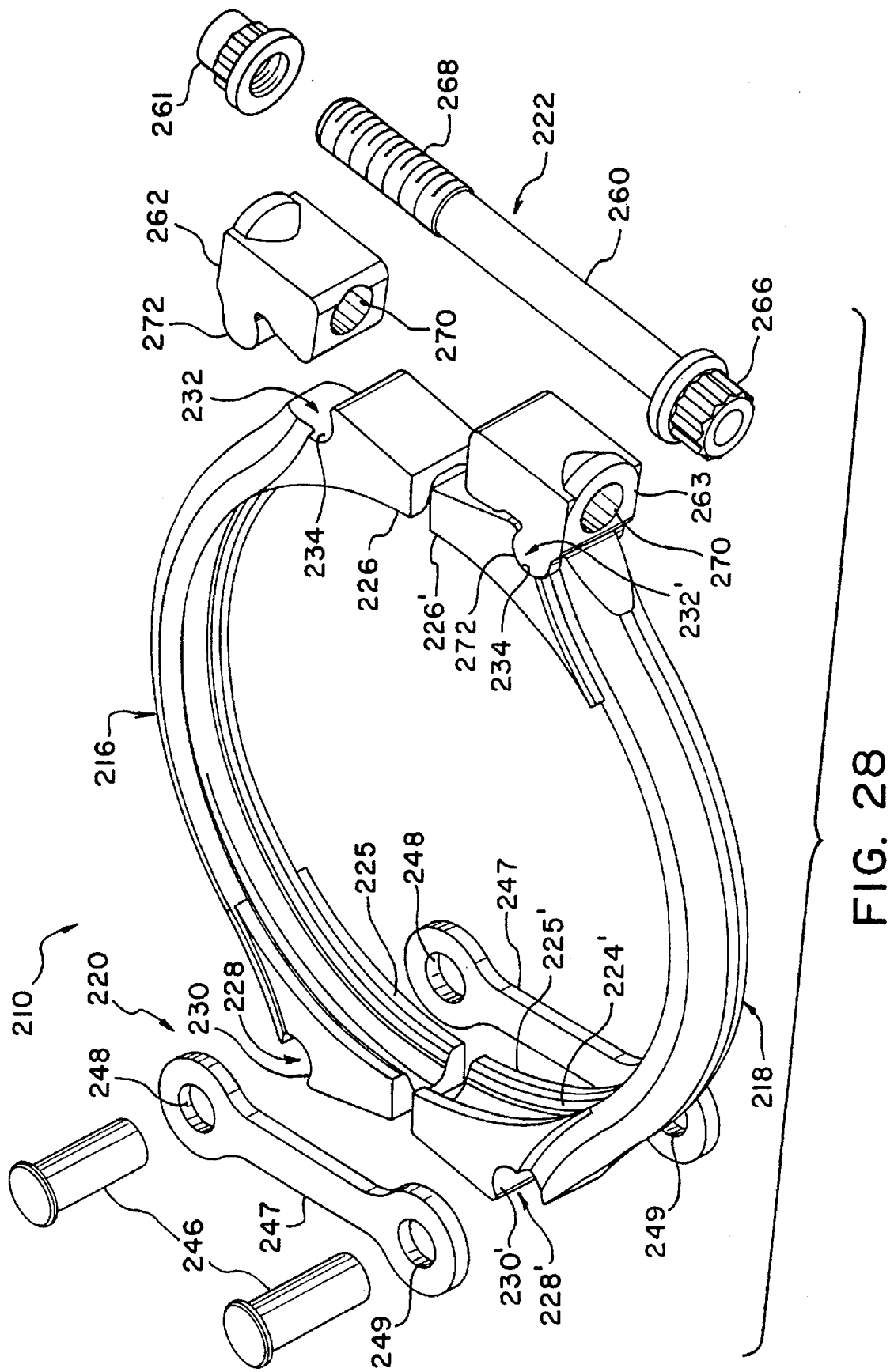
FIG. 28 is a partially exploded bottom, side perspective view of the pipe coupling device of FIGS. 26 and 27 in accordance with a third embodiment of the present invention.

Referring now to FIGS. 26–28, a pipe coupling device 210 in accordance with a third embodiment of the present invention is illustrated, and includes a first or upper retainer 216, a second or lower retainer 218, a hinge assembly 220, and a latch assembly 222. Pipe coupling device 210 is substantially identical to pipe coupling devices 10 and 110, discussed above, except that the connection of retainer 116 to latch assembly 222 of pipe coupling device 210 has been slightly modified from the previous embodiments, and the fail-safe link has been eliminated. Thus, pipe coupling device 210 will not be discussed in detail herein.

First retainer 216 is an arcuate retaining member having a substantially V-shaped gripping groove 224 extending from a first end 225 of retainer 216 to a second end 226 of retainer 216. Preferably, the arc extending between first end 225 and second end 226 of retainer 216 is approximately 180°.

First retainer 216 has an open pivot hole or pivot slot 228 adjacent its first end 225 for pivotally attaching one end of hinge assembly 220 thereto, and an open coupling hole or slot 232 adjacent its second end 226 for releasably coupling latch assembly 222 thereto as discussed below. Pivot slot 228 has a curved coupling surface 230 extending through an arc of approximately 235° to approximately 250° for retaining hinge assembly 220 thereto. Of course, curved coupling surface 230 can extend through an arc of 360°, i.e., to form a closed pivot hole or slot, if desired as discussed in one of the later embodiments of the present invention. However, to minimize weight, pivot slot 228 is preferably an open hole with curved coupling surface 230 extending through an arc greater than 180° and less than 360° to pivotally retain latch assembly 220 to first retainer 216 as discussed below. Moreover, an open hole for pivot slot 228 minimizes the size of the bar stock needed to manufacture retainer 216.

In this embodiment, coupling slot 232 is an open coupling hole with a curved coupling surface 234 extending through an arc less than 360°. Moreover, coupling surface 234 preferably extends through an arc of approximately 235° to approximately 250° so that a portion of latch assembly 222 is retained in coupling slot 232. Of course, coupling surface 234 of coupling slot 232 extends through an arc of 360° if needed and/or desired by modifying the latch assembly 222.

Second or lower retainer 218 is substantially identical to first or upper retainer 216. Accordingly, like reference numerals with primes will be used to indicate portions of retainer 218 which are similar to retainer 216. In view of the similarities between retainers 216 and 218, retainer 218 will not be discussed in detail herein.

Basically, retainer 218 has a gripping groove 224' extending from its first end 225' to its second end 226'. First end 225' has an open pivot hole or slot 228', while second end 226' has an open coupling hole or slot 232'. Pivot slot 228' and coupling slot 232' have coupling surfaces 230' and 234', respectively, which preferably extend through an arc greater than 180° and less than 360° for retaining a portion of hinge assembly 220 and latch assembly 222 therein.

Hinge assembly 220 includes a pair of pivot pins 246 and a pair of links 247 for pivotally coupling the first ends of retainers 216 and 218 together. Specifically, links 247 each have a first pivot hole 248 at one end for receiving one of the pivot pins 246 therein, and a second pivot hole 249 at its other end for receiving the other pivot pin 246 therein. Pivot pins 246 are received and pivotally retained in pivot slots 228 and 228' of retainers 216 and 218, respectively.

Latch mechanism 222 is coupled to second ends 226 and 226' of retainers 216 and 218, and includes a tension bolt 260, a nut 261, and a pair of coupling members or blocks 262 and 263. Tension bolt 260 has a head 266 with a non-circular shape and a threaded shaft 268 for threadedly receiving nut 261 to releasably couple second ends 226 and 226' of retainers 216 and 218 together.

Coupling members or blocks 262 are preferably substantially identical, except that coupling block 263 is facing in the opposite direction of coupling block 262. Accordingly, like reference numerals will be given to each of the coupling blocks 262 and 263. Coupling blocks 262 and 263 each include a fastener hole 270 for receiving shaft 268 of tension bolt 260 therethrough, and a tenon 272 extending therefrom for being received in either coupling slot 232 or 232' of retainers 216 or 218. Tenons 272 of coupling blocks 262 and 263 are preferably deformed or swaged to fixedly secure coupling blocks 262 and 263 in coupling slots 232 and 232' of retainers 216 and 218, respectively.

Fastener holes 270 of coupling blocks 262 and 263 are sized slightly larger than the diameter of tension bolt shaft 268 so that shaft 268 can freely slide within fastener holes 270. However, fastener hole 270 of coupling block 262 can be threaded so as to eliminate the need for nut 261 as in the next embodiment.

Fourth Embodiment

Figure 31:
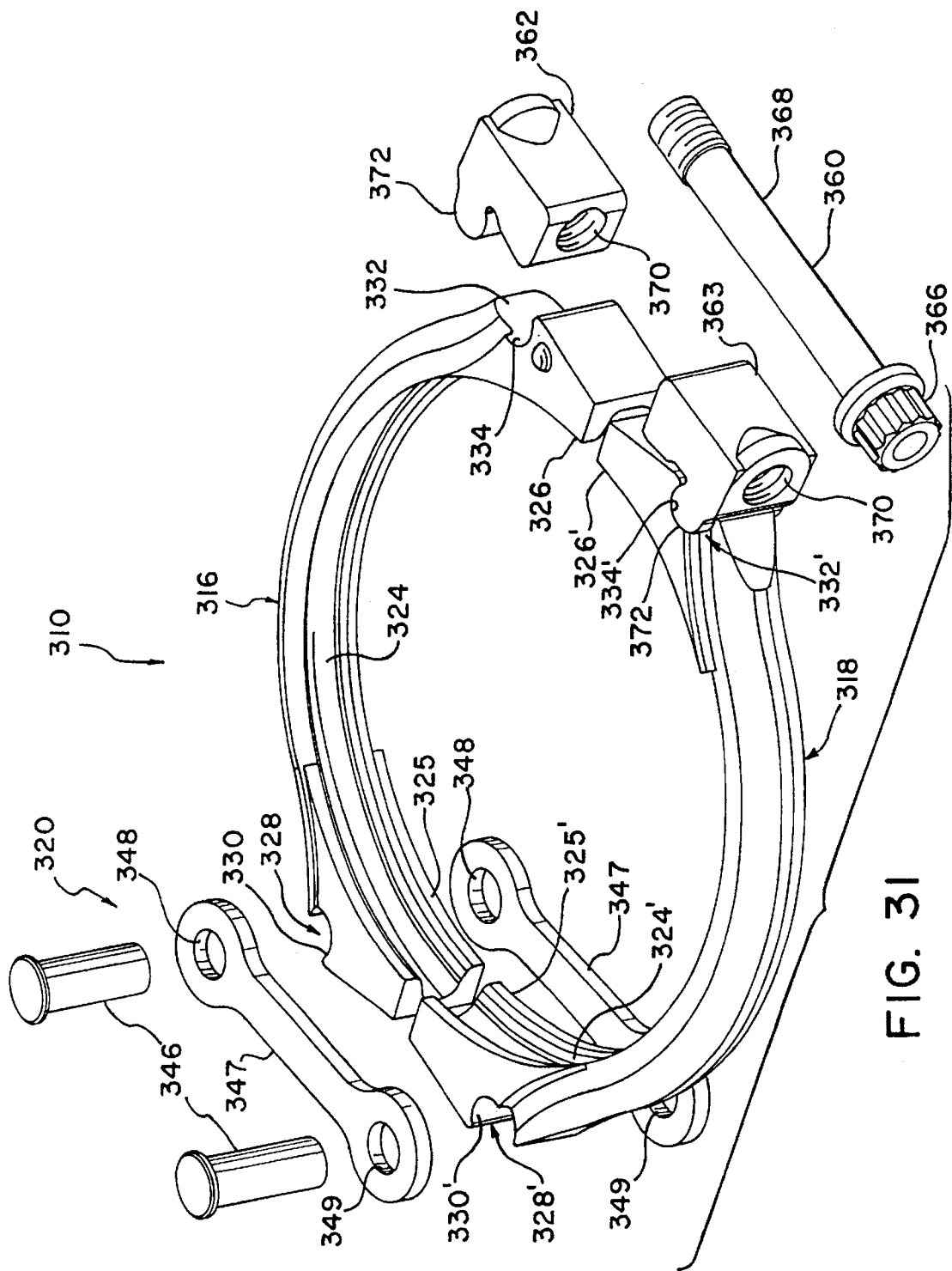
FIG. 31 is a partially exploded perspective view of the pipe coupling device of FIGS. 29 and 30 in accordance with a fourth embodiment of the present invention.
Figure 34:
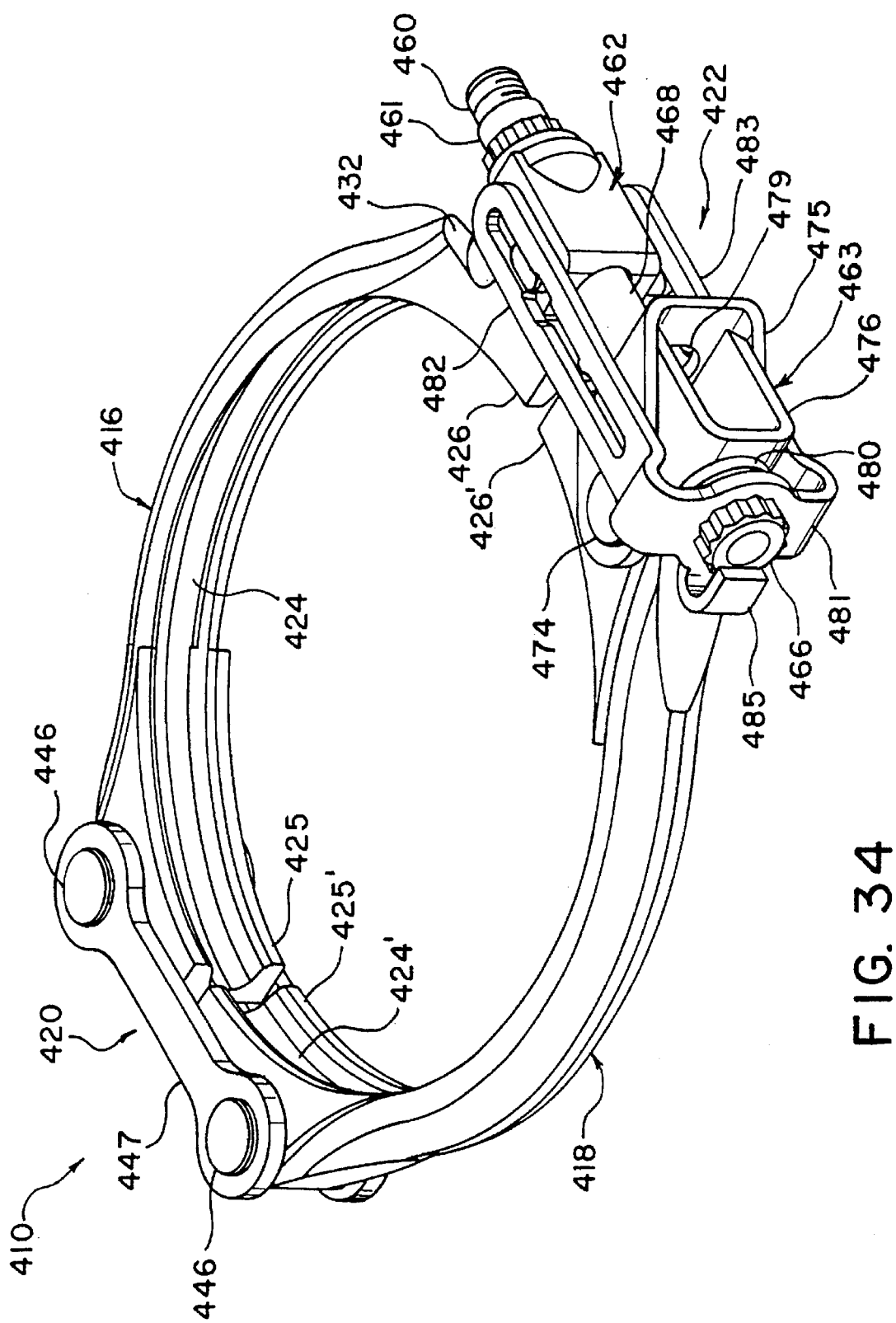
FIG. 34 is a bottom, side perspective view of the pipe coupling device of FIGS. 32 and 33 in accordance with a fifth embodiment of the present invention.
Figure 35:
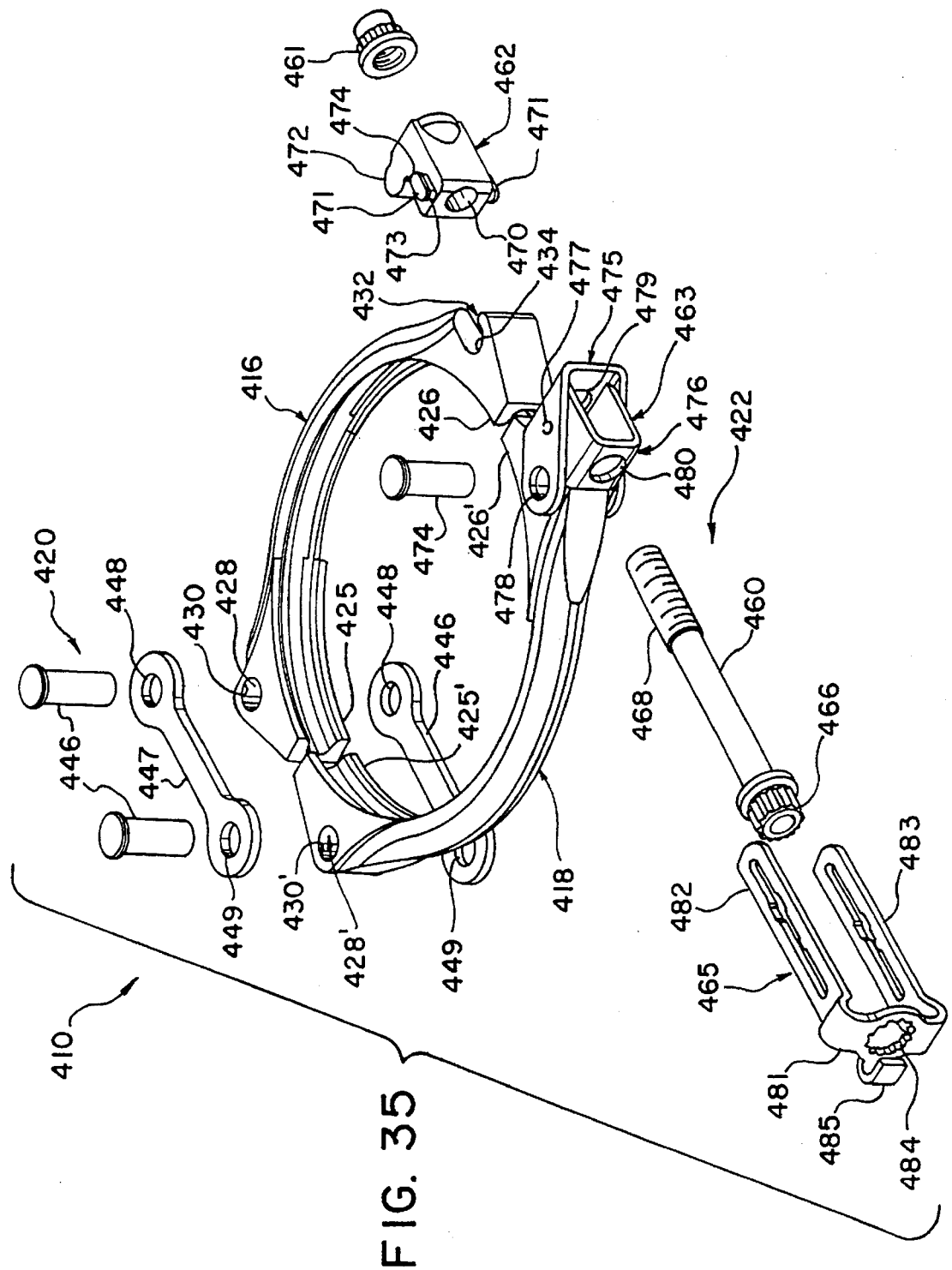
FIG. 35 is a partially exploded side perspective view of the pipe coupling device of FIGS. 32–34 in accordance with a fifth embodiment of the present invention.

Referring now to FIGS. 29–31, a pipe coupling device 310 in accordance with a third embodiment of the present invention is illustrated, and includes a first or upper retainer 316, a second or lower retainer 318, a hinge assembly 320, and a latch assembly 322. The pipe coupling device 310 in accordance with this embodiment is substantially identical to the pipe coupling device of the third embodiment, except that the latch assembly has been modified. Accordingly, pipe coupling device 310 will not be discussed or illustrated in detail herein.

First retainer 316 is an arcuate retaining member having a substantially V-shaped gripping groove 324 extending from a first end 325 of retainer 316 to a second end 326 of retainer 316. Preferably, the arc extending between first end 325 and second end 326 of retainer 316 is approximately 180°.

First retainer 316 has an open pivot hole or slot 328 adjacent its first end 325 for pivotally attaching one end of hinge assembly 320 thereto, and an open coupling hole or slot 332 adjacent its second end 326 for releasably coupling latch assembly 322 thereto as discussed below. Pivot slot 328 has a curved coupling surface 330 extending through an arc of approximately 235° to approximately 250°. Of course, curved coupling surface 330 can extend through an arc of 360° to form a closed pivot hole or slot, if needed and/or desired. However, to minimize weight and reduce material usage, coupling slot 328 is preferably an open hole with curved coupling surface 330 extending through an arc greater than 180° and less than 360° to pivotally retain latch assembly 320 to first retainer 316 as discussed in the preceding embodiments.

In this embodiment, coupling slot 332 is an open coupling slot or hole such that coupling surface 334 extends through an arc less than 360° so that a portion of latch assembly 322 is releasably retained in coupling slot 332.

Second or lower retainer 318 is substantially identical to first or upper retainer 316, except that its connection to latch assembly 322 has been slightly modified to be pivotally coupled thereto. Accordingly, like reference numerals with primes will be used to indicate portions of retainer 318 which are similar to retainer 316. In view of the similarities between retainers 316 and 318, retainer 318 will not be discussed in detail herein.

Basically, retainer 318 has a gripping groove 324' extending from its first end 325' to its second end 326'. First end 325' has an open pivot hole or slot 328', while second end 326' has an open coupling hole or slot 332'. Pivot slot 328' and coupling slot 332' have coupling surfaces 330' and 334', respectively, which preferably extend through an arc greater than 180° and less than 360° for retaining a portion of hinge assembly 320 and latch assembly 322 therein.

Hinge assembly 320 includes a pair of pivot pins 346 and a pair of links 347 for pivotally coupling the first ends 325 of retainers 316 and 318 together. Specifically, links 347 each have a first pivot hole 348 at one end for receiving one of the pivot pins 346 therein, and a second pivot hole 349 at its other end for receiving the other pivot pin 346 therein. Pivot pins 346 are received in pivot slots 328 and 328' of retainers 316 and 318, respectively.

Latch mechanism 322 is coupled to second ends 326 and 326' of retainers 316 and 318, and includes a tension bolt 360, a first threaded coupling member or block 362, and a second threaded coupling member 363.

Tension bolt 360 has a head 366 with a non-circular shape and a partially threaded shaft 368 for threadedly receiving coupling block 362 to releasably couple second ends 326 and 326' of retainers 316 and 318 together.

Coupling block 362 includes a threaded fastener hole 370 for threadedly receiving shaft 368 of tension bolt 360 therethrough, and a tenon 372 extending therefrom for being received in coupling slot 332 of retainer 316. Coupling block 363 is identical to coupling block 362, but faces in the opposite direction. Coupling block 363 includes a threaded fastener hole 370 for engaging the non-threaded portion of shaft 368 of bolt 360 therethrough, and a tenon 372 extending therefrom for being fixedly coupled in coupling slot 332' of retainer 318. Preferably, the ends of tenon 372 are deformed or swaged to fixedly secure block 363 to retainer 318.

Fifth Embodiment

Referring now to FIGS. 32–35, a pipe coupling device 410 in accordance with a fifth embodiment of the present invention is illustrated and includes a first or upper retainer 416, a second or lower retainer 418, a hinge assembly 420, and a latch assembly 422. This embodiment is substantially similar to pipe coupling device 10, discussed above, except that latch assembly 422 of this embodiment has been modified, as well as the ends of the retainers 416 and 418. Thus, this embodiment will not be discussed or illustrated in detail herein.

First retainer 416 is an arcuate retaining member having a substantially V-shaped gripping groove 424 extending from a first end 425 of retainer 416 to a second end 426 of retainer 416. Preferably, the arc extending between first end 425 and second end 426 of retainer 416 is approximately 180°.

First retainer 416 has a closed pivot hole or slot 428 adjacent its first end 425 for pivotally attaching one end of hinge assembly 420 thereto, and an open coupling hole or slot 432 adjacent its second end 426 for releasably coupling latch assembly 422 thereto as discussed below. Pivot slot 428 has a curved coupling surface 430 extending through an arc of 360°. However, to minimize weight and reduce material usage, coupling slot 428 can be an open hole with curved coupling surface 430 extending through an arc greater than 180° and less than 360° to pivotally retain latch assembly 420 to first retainer 416 as discussed in the preceding embodiments.

Coupling slot 432 has a coupling surface 434 which preferably extends through an arc greater than 180° and less than 360° for releasably retaining a portion of latch assembly 422 therein.

Second or lower retainer 418 is substantially identical to first or upper retainer 416, except that its connection to latch assembly 422 has been slightly modified. Accordingly, like reference numerals with primes will be used to indicate portions of retainer 418 which are similar to retainer 416. In view of the similarities between retainers 416 and 418, retainer 418 will not be discussed in detail herein.

Basically, retainer 418 has a gripping groove 424' extending between its first end 425' to its second end 426'. First end 425' has a closed pivot hole or slot 428', while second end 426' has a closed coupling hole or slot 432'. Pivot slot 428' and coupling slot 432' are closed holes such that coupling surface 430' and 434' extend through an arc of 360° to retain a portion of hinge assembly 420 and latch assembly 422, as discussed below.

Hinge assembly 420 includes a pair of pivot pins 446 and a pair of links 447 for pivotally coupling the first ends 425 of retainers 416 and 418 together. Specifically, links 447 each have a first pivot hole 448 at one end for receiving one of the pivot pins 446 therein, and a second pivot hole 449 at its other end for receiving the other pivot pin 446 therein. Pivot pins 446 are received in closed pivot slots 428 and 428' of retainers 416 and 418, respectively.

Latch mechanism 422 is coupled to second ends 426 and 426' of retainers 416 and 418, and includes a tension bolt 460, a nut 461, a first coupling member or block 462, a second coupling member 463, and a substantially U-shaped fail-safe link 465.

Tension bolt 460 has a head 466 with a non-circular shape and a threaded shaft 468 for threadedly receiving nut 461 to releasably couple second ends 426 and 426' of retainers 416 and 418 together.

Coupling member 462 is casted block formed as an integral, one-piece, unitary member, and includes a fastener hole 470 for receiving shafts 468 of tension bolt 460 therethrough, a pair of headed members 471 for securing fail-safe link 465 thereto, and a tenon 472 extending therefrom for being received in coupling slot 432 of retainers 416. Alternatively, coupling member 462 can be constructed of a steel metal member and a pin in the same manner as coupling member 463 discussed below. In other words, coupling member 462 can be substantially identical in construction as coupling member 463 discussed below.

Fastener hole 470 of coupling block 462 is sized slightly larger than the diameter of tension bolt shaft 468 so that shaft 468 can freely slide within fastener hole 470. However, fastener hole 470 of coupling block 462 can be threaded so as to eliminate the need for nut 461.

Headed members 471 of coupling block 462 extend in opposite directions from the sides of coupling block 462, and each include a base portion 473 and a head portion 474 such that a portion of fail-safe link 465 is retained by headed members 471 on coupling block 462.

Tenon 472 has a curved outer surface forming a part of a cylinder which is received in coupling slot 432 of retainer 416. Preferably, the curved outer surface of tenon 472. It will be apparent from those skilled in the art from this disclosure that tenon 472 of block 462 can be constructed of a variety of shapes.

Coupling member 463 is constructed of a cylindrical tenon or pivot pin 474 coupled to two sheet metal members 475 and 476. Members 475 and 476 are U-shaped members with their leg portions nested together and fixedly coupled together by spot welds 477. Thus, coupling member 463 is a substantially rectangular member with a pair of side walls formed by the leg portions of members 475 and 476, and a pair of end walls formed by the bight portions of members 475 and 476. Member 475 has a pair of pivot holes 478 formed in its leg portions for retaining tenon 474 therein, and a fastener hole 479 in its bight portion for receiving shaft 468 of bolt 460 therein. Member 476 has a fastener hole 480 in its bight portion, which is aligned with hole 479 of member 475 so that bolt 460 extends through holes 479 and 480.

Latch assembly 422 is pivotally coupled to retainer 418 by tenon 474 being pivotally received in closed coupling slot or hole 432'. The ends of tenon 474 are deformed or swaged to fixedly secure latch assembly 422 to retainer 418.

Fail-safe link 465 includes a bight portion 481, a first leg portion 482 and a second leg portion 483. Bight portion 481 has a non-circular shaped hole 484 having a shape corresponding to the shape of head 466 of tension bolt 460 for receiving head 466 of tension bolt 460 therein. Accordingly, when head 466 of tension bolt 460 is received in hole 484 of bight portion 481, bolt 460 cannot rotate relative to fail-safe link 465. Bight portion 481 also includes a tab 485 bent such as to obstruct a tool from engaging head 466 of tension bolt 460 when latch assembly 422 is assembled.

Leg portions 482 and 483 are substantially identical, and each includes a longitudinally extending slot 486 for receiving one of the headed members 471 of block 462 therein.

Sixth Embodiment

Referring now to FIGS. 36–45, a pipe coupling device 510 in accordance with a sixth embodiment of the present invention is illustrated, and includes a first or upper retainer 516, a second or lower retainer 518, a hinge assembly 520, and a latch assembly 522. Pipe coupling device 510 in accordance with this embodiment is somewhat similar to the pipe coupling device 10 of the first embodiment, except that latch assembly 520 has been modified. Thus, pipe coupling device 510 will not be illustrated or discussed in detail herein. Rather, only the differences between this embodiment and the prior embodiment will be discussed in detail.

First retainer 516 is an arcuate retaining member having a substantially V-shaped gripping groove 524 extending from a first end 525 of retainer 516 to a second end 526 of retainer 516. Preferably, the arc extending between first end 525 and second end 526 of retainer 516 is approximately 180°.

First retainer 516 has an open pivot hole or pivot slot 528 adjacent its first end 525 for pivotally attaching one end of hinge assembly 520 thereto, and an open coupling hole or slot 532 adjacent its second end 526 for releasably coupling latch assembly 522 thereto as discussed below.

Pivot slot 528 has a curved coupling surface 530 extending through an arc of approximately 235° to approximately 250° for retaining hinge assembly 520 thereto. Of course, curved coupling surface 530 can extend through an arc of 360° to form a closed hole or slot, if desired as discussed in one of the preceding embodiments of the present invention. However, to minimize weight and reduce material usage, coupling slot 528 Is preferably an open hole with curved coupling surface 530 extending through an arc greater than 180° and less than 360° to pivotally retain latch assembly 520 to first retainer 516 as discussed below.

In this embodiment, coupling slot 532 is an open coupling hole with a coupling surface 534 extending through an arc less than 360°. Moreover, coupling surface 534 preferably extends through an arc of approximately 235° to approximately 250° so that a portion of latch assembly 522 is pivotally retained in coupling slot 532.

Second or lower retainer 518 is preferably identical to first or upper retainer 516 as seen in FIG. 36. Accordingly, like reference numerals with primes will be used to indicate portions of retainer 518 which are similar to retainer 516. In view of the similarities between retainers 516 and 518, retainer 518 will not be discussed in detail herein.

Basically, retainer 518 has a gripping groove 524' extending between its first end 525' to its second end 526'. First end 525' has a closed pivot hole or slot 528', while second end 526' has a closed coupling hole or slot 532'. Pivot slot 528' and coupling slot 532' have coupling surfaces 530' and 534', respectively, which preferably extend through an arc greater than 180° and less than 360° for retaining a portion of hinge assembly 520 and latch assembly 522 therein.

Hinge assembly 520 includes a pair of pivot pins 546 and a pair of links 547 for pivotally coupling the first ends of retainers 516 and 518 together. Specifically, links 547 each have a first pivot hole 548 at one end for receiving one of the pivot pins 546 therein, and a second pivot hole 549 at its other end for receiving the other pivot pin 546 therein. Pivot pins 546 are received in closed pivot slots 528 and 528' of retainers 516 and 518, respectively.

Figure 39:
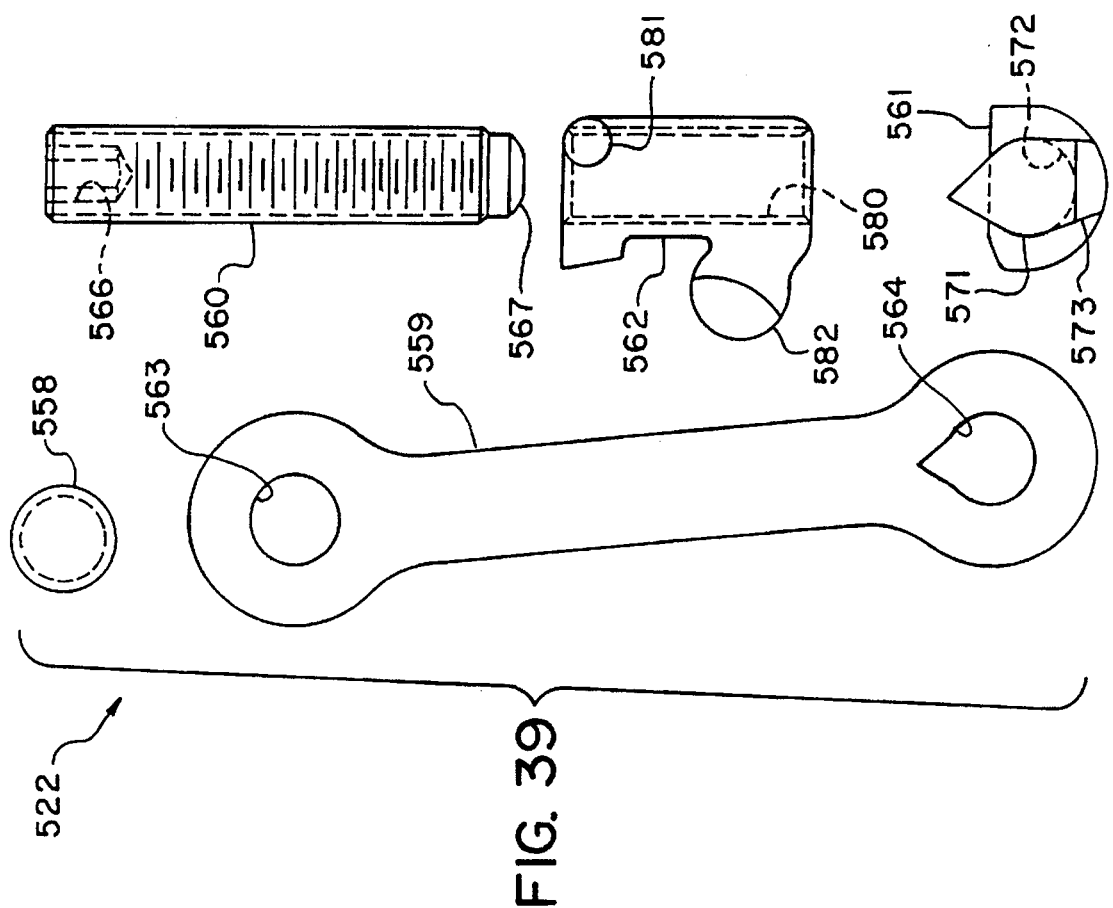
FIG. 39 is an exploded, side elevational view of the latch assembly illustrated in FIG. 38 for the pipe coupling device of FIGS. 36 and 37 in accordance with a sixth embodiment of the present invention.
Figure 38:
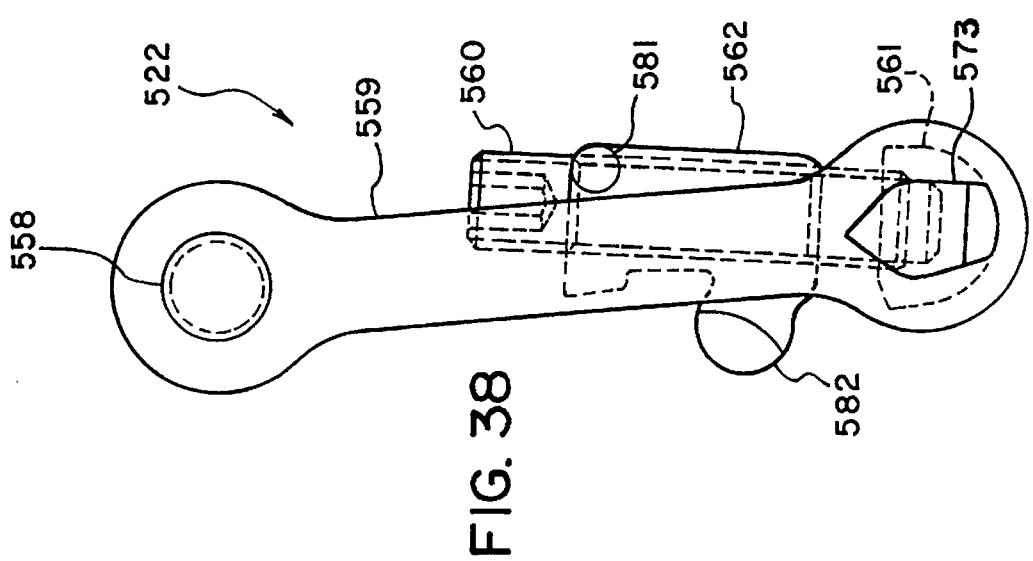
FIG. 38 is a side elevational view of the latch assembly for the pipe coupling device of FIGS. 36 and 37 in accordance with a sixth embodiment of the present invention.

As seen in FIGS. 38 and 39, latch mechanism 522 is coupled to second ends 526 and 526' of retainers 516 and 518, and includes a pivot pin 558, a pair of dog bone links 559, a compression bolt 560, a cradle 561, and a coupling member or block 562.

Links 559 are pivotally coupled at one of their ends to first retainer 516 via pivot pin 558, which is rotatably received in coupling slot 532 of first retainer 516, and fixedly coupled at their other end to cradle 562, which is releasably coupled to second retainer 518 via bolt 560 and block 562. Specifically, each of the links 559 has a hole 563 at one end for receiving pivot pin 558 therein, and a hole 564 at its other end for receiving and fixedly retaining cradle 561 therein. Pivot pin 558 is preferably a rivet which is deformed at one end to pivotally secure links 559 to retainer 516. Hole 564 is preferably non-circular so that a portion of cradle 561 can be non-movably received therein as discussed below. While only two links are illustrated in the drawings, it will become apparent to those skilled in the art from this disclosure that more than two links can be utilized as needed and/or desired.

Compression bolt 560 has a non-circular shaped recess 566 at one end, a chamfered or beveled end 567, and a threaded shaft 568. Compression bolt 560 is threadedly coupled to coupling block 562 such that beveled end 567 engages cradle 561. In other words, pipe coupling device 510 is tightened about a pair of pipes by turning bolt 560 so that the relative distance between cradle 561 and coupling block 562 increases and the relative distance between second ends 526 and 526' of retainers 516 and 518 decreases. Compression bolt 560 is preferably constructed out of a conventional metallic material such as stainless steel or any other suitable high strength material.

As seen in FIGS. 38, 39 and 40–43, cradle 561 has a half cylindrical body portion 570 and a pair of oppositely extending shafts 571. Body portion 570 has a pair of oppositely extending shafts 571. Body portion 570 has a semi-spherical recess 572 for receiving beveled end 567 of bolt 560 therein. Shafts 571 are non-circular with a shape complementary to the shape of holes 564 of links 559, and have ear portions 573 which are bent or deformed for fixedly and rigidly securing cradle 561 to links 559.

Referring now to FIGS. 44 and 45, coupling block 562 includes a threaded fastener hole 580 for threadedly receiving shaft 568 of bolts 560 therethrough, a pair of detents 581 for engaging links 559 via a snap-fit and a tenon 582 extending therefrom for being received in coupling slot 532' of retainer 518. This arrangement does not require a self-locking feature such as a free running torque. However, coupling block 562 can be optionally provided with a self-locking feature such as the tapping threads of fastener hole 580 of block 562 so that they lock with the threads of bolt 560, if desired, for added safety. This would clearly prevent bolt 560 from unthreading from block 562 due to vibrations. Detents 581 extend in opposite directions from the sides of coupling block 562, and engage links 559 to hold latch assembly 522 in its correct position for tightening retainers 516 and 518 about the pipes.

Tenon 582 has a curved outer surface forming a part of a cylinder which is received in coupling slot 532' of retainer 518. It will be apparent from those skilled in the art from this disclosure that tenons 582 of block 562 can be constructed of a variety of shapes. In particular, a variety of tenon and mortise shapes can be utilized to connect coupling block 562 to second end 526' of retainer 518 via coupling slot 532', so long as coupling slot 532' is also modified to have a complementary shape as the tenon.

Tenon 582 is fixedly and rigidly retained with coupling slot 532' of retainer 518 by swaging the ends of tenon 582. Preferably, the ends of tenon 582 extend outwardly from the sides of coupling block 562 to act as stop members 583, which prevent links 599 from being pivoted past its correct position. In other words, links 599 are retained between stop members 583 and detents 581 so that recess 572 of cradle 561 is aligned with beveled end 567 of bolt 560.

While several embodiments have been chosen to illustrate the invention, it will be understood by those skilled in the art that various changes and modifications can be made herein without departing from the scope of the invention as defined in the appended claims.

What is claimed is:

1. A pipe coupling device for releasably coupling a pair of pipes with peripheral end flanges together, comprising:

a first arcuate retainer including a first end with a first pivot point adjacent thereto, a second end having a first coupling slot with a first coupling surface, and a first gripping groove with an inner gripping surface extending between said first and second ends for receiving a first portion of each of the peripheral end flanges of the pipes therein;

a second arcuate retainer including a first end with a second pivot point adjacent thereto, a second end having a second coupling slot with a second coupling surface, and a second gripping groove with an inner gripping surface extending between said first and second ends of said second arcuate retainer for receiving a second portion of each of the peripheral end flanges of the pipes therein;

a hinge pivotally coupling said first ends of said first and second retainers together; and a latch releasably coupling said second end of said second retainer to said second end of said first retainer, said latch including
        a first coupling member having a first tenon for engaging said first coupling surface of said first coupling slot and a first fastener hole extending therethrough,
        a second coupling member having a second tenon for engaging said second coupling surface of said second coupling slot to be retained therein and a second fastener hole extending therethrough,
        a threaded fastener having a head for engaging one of said coupling members and a threaded shaft received in said fastener holes of said first and second coupling members to releasably couple said second ends of said retainers together, and
        a nut threadedly engaging said shaft of said fastener,
    at least one of said coupling surfaces of one of said coupling slots forming a mortise to fixedly retain one of said tenons thereto via a tenon and mortise arrangement.

2. A pipe coupling device according to claim 1, wherein said latch further includes a fail-safe link having a bight portion with a hole for receiving a part of said fastener therein, a first leg with a first longitudinal slot for receiving therein a first headed member formed on said first coupling member, and a second leg with a second longitudinal slot for receiving therein a second headed member formed on said first coupling member.

3. A pipe coupling device for releasably coupling a pair of pipes with peripheral end flanges together, comprising:

a first arcuate retainer including a first end with a first pivot point adjacent thereto, a second end with a first coupling surface adjacent thereto, and a first gripping groove with an inner gripping surface extending between said first and second ends for receiving a first portion of each of the peripheral end flanges of the pipes therein;

a second arcuate retainer including a first end with a second pivot point adjacent thereto, a second end with a second coupling surface adjacent thereto, and a second gripping groove with an inner gripping surface extending between said first and second ends of said second arcuate retainer for receiving a second portion of each of the peripheral end flanges of the pipes therein;

a hinge pivotally coupling said first ends of said first and second retainers together; and a latch releasably coupling said second end of said second retainer to said second end of said first retainer, said latch including
        a first coupling member having a first tenon for engaging said first coupling surface and a first fastener hole extending therethrough,
        a second coupling member having a second tenon for engaging said second coupling surface to be retained therein and a second fastener hole extending therethrough,
        a fail-safe link having a bight portion with a hole for receiving a part of said fastener therein, a first leg with a first longitudinal slot for receiving therein a first headed member formed on said first coupling member, and a second leg with a second longitudinal slot for receiving therein a second headed member formed on said first coupling member,
        a threaded fastener having a head for engaging one of said coupling members and a threaded shaft received in said fastener holes of said first and second coupling members to releasably couple said second ends of said retainers together, and
        a nut threadedly engaging said shaft of said fastener,
    said head of said fastener having a non-circular shape and said hole of said fail-safe link has a corresponding non-circular shape for non-rotatably receiving said head of said fastener therein.

4. A pipe coupling device according to claim 3, wherein said bight portion of said fail-safe link has a tab extending adjacent said head of said fastener to obstruct a tool from being applied to said head of said fastener.

5. A pipe coupling device for releasably coupling a pair of pipes with peripheral end flanges together, comprising:

a first arcuate retainer including a first end with a first pivot point adjacent thereto, a second end with a first coupling surface adjacent thereto, and a first gripping groove with an inner gripping surface extending between said first and second ends for receiving a first portion of each of the peripheral end flanges of the pipes therein;

a second arcuate retainer including a first end with a second pivot point adjacent thereto, a second end with a second coupling surface adjacent thereto, and a second gripping groove with an inner gripping surface extending between said first and second ends of said second arcuate retainer for receiving a second portion of each of the peripheral end flanges of the pipes therein;

a hinge pivotally coupling said first ends of said first and second retainers together; and a latch releasably coupling said second end of said second retainer to said second end of said first retainer, said latch including a first coupling member having a first tenon for engaging said first coupling surface and a first fastener hole extending therethrough, a second coupling member having a second tenon for engaging said second coupling surface to be retained therein and a second fastener hole extending therethrough, a fail-safe link having a bight portion with a hole for receiving a part of said fastener therein, a first leg with a first longitudinal slot for receiving therein a first headed member formed on said first coupling member, and a second leg with a second longitudinal slot for receiving therein a second headed member formed on said first coupling member, a threaded fastener having a head for engaging one of said coupling members and a threaded shaft received in said fastener holes of said first and second coupling members to releasably couple said second ends of said retainers together, and a nut threadedly engaging said shaft of said fastener, said first retainer further including a first detent adjacent said second end of said first retainer for engaging one of said leg portions of said fail-safe link to releasably secure said latch to said second end of said first retainer.

6. A pipe coupling device according to claim 5, wherein one of said leg portions of said fail-safe link further includes a first opening for receiving said first detent therein.

7. A pipe coupling device according to claim 6, wherein said first retainer further includes a second detent adjacent said second end of said first retainer for being received in a second opening formed in the other of said leg portions of said fail-safe link.

8. A pipe coupling device according to claim 1, wherein said first and second coupling members are substantially identical, but face in opposite directions.

9. A pipe coupling device according to claim 1, wherein said coupling members are integral, one-piece, unitary members.

10. A pipe coupling device according to claim 9, wherein said second tenon of said second coupling member is a partially cylindrical member with a curved outer surface for engaging said second coupling slot of said second retainer.

11. A pipe coupling device according to claim 10, wherein said latch further includes a fail-safe link having a bight portion with a hole for receiving a part of said fastener therein, a first leg with a first longitudinal slot for receiving therein a first headed member formed on each of said first and second coupling members, and a second leg with a second longitudinal slot for receiving therein a second headed member formed on each of said first and second coupling members.

12. A pipe coupling device according to claim 11, wherein each of said first and second leg portions has a retaining plate overlying one end of said second tenon and one end of said second coupling slot to prevent said second tenon from sliding out of said second coupling slot of said second retainer.

13. A pipe coupling device for releasably coupling a pair of pipes with peripheral end flanges together, comprising:

a first arcuate retainer including a first end with a first pivot point adjacent thereto, a second end with a first coupling surface adjacent thereto, and a first gripping groove with an inner gripping surface extending between said first and second ends for receiving a first portion of each of the peripheral end flanges of the pipes therein;

a second arcuate retainer including a first end with a second pivot point adjacent thereto, a second end with a second coupling surface adjacent thereto, and a second gripping groove with an inner gripping surface extending between said first and second ends of said second arcuate retainer for receiving a second portion of each of the peripheral end flanges of the pipes therein, a hinge pivotally coupling said first ends of said first and second retainers together; and a latch releasably coupling said second end of said second retainer to said second end of said first retainer, said latch including a first coupling member being an integral one-piece, unitary member, and having a first tenon for engaging said first coupling surface and a first fastener hole extending therethrough, a second coupling member being an integral, one-piece, unitary member, and having a second tenon for engaging said second coupling surface to be retained therein and a second fastener hole extending therethrough, said second tenon of said second coupling member being a partially cylindrical member with a curved outer surface for engaging said second coupling slot of said second retainer, a fail-safe link having a bight portion with a hole for receiving a part of said fastener therein, a first leg with a first longitudinal slot for receiving therein a first headed member formed on each of said first and second coupling members, and a second leg with a second longitudinal slot for receiving therein a second headed member formed on each of said first and second coupling members, a threaded fastener having a head for engaging one of said coupling members and a threaded shaft received in said fastener holes of said first and second coupling members to releasably couple said second ends of said retainers together, and a nut threadedly engaging said shaft of said fastener, each of said first and second leg portions having a retaining plate overlying one end of said second tenon and one end of said second coupling slot to prevent said second tenon from sliding out of said second coupling slot of said second retainer, said head of said fastener having a non-circular shape and said hole of said fail-safe link has a corresponding non-circular shape for non-rotatably receiving said head of said fastener therein.

14. A pipe coupling device according to claim 13, wherein said bight portion of said fail-safe link has a tab extending adjacent said head of said fastener to obstruct a tool from being applied to said head of said fastener.

15. A pipe coupling device according to claim 14, wherein said first retainer further includes a first detent adjacent said second end of said first retainer for engaging one of said leg portions of said fail-safe link to releasably secure said latch to said second end of said first retainer.

16. A pipe coupling device according to claim 1, wherein a portion of said second tenon of said second coupling block is deformed to be fixedly retained within said second coupling slot of said second retainer.

17. A pipe coupling device according to claim 16, wherein a portion of said first tenon of said first coupling block is deformed to be fixedly retained in said first coupling slot of said first retainer.

18. A pipe coupling device according to claim 17, wherein said first and second coupling blocks are substantially identical.

19. A pipe coupling device according to claim 18, wherein said first and second retainers are substantially identical.

20. A pipe coupling device according to claim 1, wherein said hinge includes a pair of pivot links with first ends pivotally coupled to said first pivot point of said first retainer, and second ends pivotally coupled to said second pivot point of said second retainer.

21. A pipe coupling device for releasably coupling a pair of pipes with peripheral end flanges together, comprising:
- a first arcuate retainer including a first end with a first pivot point adjacent thereto, a second end with a first coupling surface adjacent thereto, and a first gripping groove with an inner gripping surface extending between said first and second ends for receiving a first portion of each of the peripheral end flanges of the pipes therein;
- a second arcuate retainer including a first end with a second pivot point adjacent thereto, a second end with a second coupling surface adjacent thereto, and a second gripping groove with an inner gripping surface extending between said first and second ends of said second arcuate retainer for receiving a second portion of each of the peripheral end flanges of the pipes therein;
- a hinge pivotally coupling said first ends of said first and second retainers together, said hinge including a pair of pivot links with first ends pivotally coupled to said first pivot point of said first retainer, and second ends pivotally coupled to said second pivot point of said second retainer, said first and second pivot points of said first and second retainers, respectively, being open slots with curved coupling surfaces extending through an arc greater than 180° and less than 360° for pivotally retaining first and second pivot pins, respectively, said first pivot pin being coupled to said first ends of said pivot links and said second pivot pin being coupled to said second ends of said pivot links; and
- a latch releasably coupling said second end of said second retainer to said second end of said first retainer said latch including
  - a first coupling member having a first tenon for engaging said first coupling surface and a first fastener hole extending therethrough,
  - a second coupling member having a second tenon for engaging said second coupling surface to be retained therein and a second fastener hole extending therethrough,
  - a threaded fastener having a head for engaging one of said coupling members and a threaded shaft received in said fastener holes of said first and second coupling members to releasably couple said second ends of said retainers together, and
  - a nut threadedly engaging said shaft of said fastener.

22. A pipe coupling device according to claim 21, wherein said second coupling surface of said second retainer is formed by an open coupling slot.

23. A pipe coupling device according to claim 21, wherein said first coupling surface of said first retainer is formed by an open coupling slot.

24. A pipe coupling device according to claim 20, wherein said first and second pivot points of said first and second retainers, respectively, are closed slots for pivotally retaining first and second pivot pins, respectively, said first pivot pin being coupled to said first ends of said pivot links and said second pivot pin being coupled to said second ends of said pivot links.

25. A pipe coupling device for releasably coupling a pair of pipes with peripheral end flanges together, comprising:
- a first arcuate retainer including a first end with a first pivot slot, a second end, and a first gripping groove with an inner gripping surface extending between said first and second ends for receiving a first portion of each of the peripheral end flanges of the pipes therein, said first pivot slot having a first curved coupling surface extending through an arc greater than 180° and less than 360° and defining an opening in said first arcuate retainer which substantially faces radially outwardly relative to said first gripping groove;
- a second arcuate retainer including a first end with a second pivot slot, a second end, and a second gripping groove with an inner gripping surface extending between said first and second ends of said second arcuate retainer for receiving a second portion of each of the peripheral end flanges of the pipes therein, said second pivot slot having a second curved coupling surface extending through an arc greater than 180° and less than 360° and defining an opening in said second arcuate retainer which substantially faces radially outwardly relative to said second gripping groove;
- a hinge including a first link and a second link with each of said links being pivotally coupled to said retainers adjacent said first ends of said retainers by first and second pivot pins being received in said first and second pivot slots, respectively; and
- a latch releasably coupling said second end of said first retainer to said second end of said second retainer.

26. A pipe coupling device according to claim 25, wherein said latch includes a first coupling member with a first tenon for engaging a first coupling slot formed adjacent said second end of said first retainer, a second coupling member with a second tenon for engaging a second coupling slot formed adjacent said second end of said second retainer, and a fastener operatively coupled between said first and second coupling members to releasably couple said second ends of said retainers together.

27. A pipe coupling device according to claim 26, wherein said first and second coupling members are substantially identical, but face in opposite directions.

28. A pipe coupling device according to claim 26, wherein said second coupling slot has a complementary mortise shape for retaining said second tenon therein.

29. A pipe coupling device according to claim 28, wherein said second coupling slot and said second tenon have interlocking curved surfaces.

30. A pipe coupling device according to claim 28, wherein said second end of said first retainer is substantially identical to said second end of said second retainer.

31. A pipe coupling device according to claim 26, wherein said fastener includes a bolt with a head and a shaft with threads, and a nut threadedly coupled to said shaft.

32. A pipe coupling device for releasably coupling a pair of pipes with peripheral end flanges together, comprising:

a first arcuate retainer including a first end with a first pivot slot, a second end, and a first gripping groove with an inner gripping surface extending between said first and second ends for receiving a first portion of each of the peripheral end flanges of the pipes therein, said first pivot slot having a first curved coupling surface extending through an arc greater than 180° and less than 360°;

a second arcuate retainer including a first end with a second pivot slot, a second end, and a second gripping groove with an inner gripping surface extending between said first and second ends of said second arcuate retainer for receiving a second portion of each of the peripheral end flanges of the pipes therein, said second pivot slot having a second curved coupling surface extending through an arc greater than 180° and less than 360°;

a hinge including a first link and a second link with each of said links being pivotally coupled to said retainers adjacent said first ends of said retainers by first and second pivot pins being received in said first and second pivot slots, respectively; and a latch releasably coupling said second end of said first retainer to said second end of said second retainer, said latch including a first coupling member with a first tenon for engaging a first coupling slot formed adjacent said second end of said first retainer, a second coupling member with a second tenon for engaging a second coupling slot formed adjacent said second end of said second retainer, and a fastener operatively coupled between said first and second coupling members to releasably couple said second ends of said retainers together, said fastener including a bolt with a head and a shaft with threads, a nut threadedly coupled to said shaft, and a fail-safe link having a bight portion with a hole for receiving a part of said fastener therein, a first leg with a first longitudinal slot for receiving therein a first headed member formed on said first coupling member, and a second leg with a second longitudinal slot for receiving therein a second headed member formed on said first coupling member.

33. A pipe coupling device according to claim 32, wherein said head of said fastener has a corresponding non-circular shape and said hole of said fail-safe link has a non-circular shape for non-rotatably receiving said head of said fastener therein.

34. A pipe coupling device according to claim 33, wherein said bight portion of said fail-safe link has a tab extending adjacent said head of said fastener to obstruct a tool from being applied to said head of said fastener.

35. A pipe coupling device according to claim 34, wherein said first retainer further includes a first detent adjacent said second end of said first retainer for engaging one of said leg portions of said fail-safe link to releasably secure said latch to said second end of said first retainer.

36. A pipe coupling device according to claim 32, wherein each of said first and second leg portions has a retaining plate overlying one end of said second tenon and one end of said second coupling slot to prevent said second tenon from sliding out of said second coupling slot of said second retainer.

37. A pipe coupling device according to claim 26, wherein said first and second coupling members include first and second fastener holes, respectively, for receiving said fastener therein.

38. A pipe coupling device according to claim 37, wherein said first fastener hole is threaded for threadedly engaging said fastener.

39. A pipe coupling device according to claim 38, wherein a portion of said second tenon of said second coupling member is deformed to retain said second tenon within said second coupling slot of said second retainer.

40. A pipe coupling device according to claim 37, wherein said fastener includes a bolt with a nut.

41. A pipe coupling device according to claim 26, wherein said first coupling member further includes a pair of links coupled at one of their ends to said first tenon, and a cradle coupled to the other ends of said links for engaging said fastener.

42. A pipe coupling device according to claim 41, wherein said second coupling member has a threaded fastener hole for threadedly receiving said fastener therein.

43. A pipe coupling device according to claim 42, wherein said cradle has a recess for engaging one end of said fastener such that said fastener is placed under compression between said second coupling member and second cradle.

44. A pipe coupling device according to claim 43, wherein said second coupling member includes at least one detent for engaging one of said links via a snap-fit.

45. A pipe coupling device according to claim 44, wherein said second tenon has first and second tenon ends with at least one of said tenon ends extending outwardly from said second coupling slot for limiting movement of said links.

46. A pipe coupling device according to claim 42, wherein said second coupling slot is a mortise for receiving and retaining said second tenon of said second coupling member therein.

47. A pipe coupling device for releasably coupling a pair of pipes with peripheral end flanges together, comprising:

a first arcuate retainer including a first end with a first pivot point, a second end having a first coupling slot with a first curved coupling surface, and a first gripping groove with an inner gripping surface extending between said first and second ends for receiving a first portion of each of the peripheral end flanges of the pipes therein;

a second arcuate retainer including a first end with a second pivot point, a second end having a second open coupling slot with a second coupling surface forming a mortise, and a groove with an inner gripping surface extending between said first and second ends of said second arcuate retainer for receiving a second portion of each of the peripheral end flanges of the pipes therein;

a hinge pivotally coupling said first ends of said retainers together; and a latch releasably coupling said second end of said first retainer to said second end of said second retainer, said latch including a first coupling member with a first tenon for engaging said first coupling slot, a second coupling member with a second tenon for engaging said mortise of said second coupling slot and being fixedly retained therein via a tenon and mortise arrangement formed therebetween, and a fastener operatively coupled between said first and second coupling members to releasably couple said second ends of said retainers together.

48. A pipe coupling device according to claim 47, wherein said second opening surface is curved to extend along an arc greater than 180° and less than 360°.

49. A pipe coupling device according to claim 47, wherein said hinge includes a pair of pivot links with first ends pivotally coupled to said first pivot point of said first retainer, and second ends pivotally coupled to said second pivot point of said second retainer.

50. A pipe coupling device for releasably coupling a pair of pipes with peripheral end flanges together, comprising:

a first arcuate retainer including a first end with a first pivot point, a second end having a first coupling slot with a first curved coupling surfacer and a first gripping groove with an inner gripping surface extending between said first and second ends for receiving a first portion of each of the peripheral end flanges of the pipes therein;

a second arcuate retainer including a first end with a second pivot point, a second end having a second coupling slot with a second coupling surface with an opening to form a mortise, and a groove with an inner gripping surface extending between said first and second ends of said second arcuate retainer for receiving a second portion of each of the peripheral end flanges of the pipes therein;

a hinge pivotally coupling said first ends of said retainers together, said hinge includes a pair of pivot links with first ends pivotally coupled to said first pivot point of said first retainer, and second ends pivotally coupled to said second pivot point of said second retainer, said first and second pivot points of said first and second retainers, respectively, being open slots with curved coupling surfaces extending through an arc greater than 180° and less than 360° for pivotally retaining first and second pivot pins, respectively, said first pivot pin being coupled to said first ends of said pivot links and said second pivot pin being coupled to said second ends of said pivot links; and a latch releasably coupling said second end of said first retainer to said second end of said second retainer, said latch including a first coupling member with a first tenon for engaging said first coupling slot, a second coupling member with a second tenon for engaging said second coupling slot and being retained therein, and a fastener operatively coupled between said first and second coupling members to releasably couple said second ends of said retainers together.

51. A pipe coupling device according to claim 47, wherein said first and second coupling members are substantially identical, but face in opposite directions.

52. A pipe coupling device according to claim 47, wherein said second end of said first retainer is substantially identical to said second end of said second retainer.

53. A pipe coupling device according to claim 47, wherein said fastener includes a bolt with a head and a shaft with threads, and a nut threadedly coupled to said shaft.

54. A pipe coupling device according to claim 53, wherein said latch further includes a fail-safe link having a bight portion with a hole for receiving a part of said fastener therein, a first leg with a first longitudinal slot for receiving therein a first headed member formed on said first coupling member, and a second leg with a second longitudinal slot for receiving therein a second headed member formed on said first coupling member.

55. A pipe coupling device for releasably coupling a pair of pipes with peripheral end flanges together, comprising:

a first arcuate retainer including a first end with a first pivot point, a second end having a first coupling slot with a first curved coupling surface, and a first gripping groove with an inner gripping surface extending between said first and second ends for receiving a first portion of each of the peripheral end flanges of the pipes therein;

a second arcuate retainer including a first end with a second pivot point, a second end having a second coupling slot with a second coupling surface with an opening to form a mortise, and a groove with an inner gripping surface extending between said first and second ends of said second arcuate retainer for receiving a second portion of each of the peripheral end flanges of the pipes therein;

a hinge pivotally coupling said first ends of said retainers together; and a latch releasably coupling said second end of said first retainer to said second end of said second retainer, said latch including a first coupling member with a first tenon for engaging said first coupling slot, a second coupling member with a second tenon for engaging said second coupling slot and being retained therein, and a fastener operatively coupled between said first and second coupling members to releasably couple said second ends of said retainers together, said fastener including a bolt with a head and a shaft with threads, a nut threadedly coupled to said shaft, and a fail-safe link having a bight portion with a hole for receiving a part of said fastener therein, a first leg with a first longitudinal slot for receiving therein a first headed member formed on said first coupling member, and a second leg with a second longitudinal slot for receiving therein a second headed member formed on said first coupling member, said head of said fastener having a corresponding non-circular shape and said hole of said fail-safe link has a non-circular shape for non-rotatably receiving said head of said fastener therein.

56. A pipe coupling device according to claim 55, wherein said bight portion of said fail-safe link has a tab extending adjacent said head of said fastener to obstruct a tool from being applied to said head of said fastener.

57. A pipe coupling device according to claim 56, wherein said first retainer further includes a first detent adjacent said second end of said first retainer for engaging one of said leg portions of said fail-safe link to releasably secure said latch to said second end of said first retainer.

58. A pipe coupling device for releasably coupling a pair of pipes with peripheral end flanges together, comprising:

a first arcuate retainer including a first end with a first pivot point, a second end having a first coupling slot with a first curved coupling surface, and a first gripping groove with an inner gripping surface extending between said first and second ends for receiving a first portion of each of the peripheral end flanges of the pipes therein;

a second arcuate retainer including a first end with a second pivot point, a second end having a second coupling slot with a second coupling surface with an opening to form a mortise, and a groove with an inner gripping surface extending between said first and second ends of said second arcuate retainer for receiving a second portion of each of the peripheral end flanges of the pipes therein;

a hinge pivotally coupling said first ends of said retainers together; and a latch releasably coupling said second end of said first retainer to said second end of said second retainer, said latch including
  a first coupling member with a first tenon for engaging said first coupling slot,
  a second coupling member with a second tenon for engaging said second coupling slot and being retained therein, and
    a fastener operatively coupled between said first and second coupling members to releasably couple said second ends of said retainers together, said fastener including a bolt with a head and a shaft with threads, a nut threadedly coupled to said shaft, and a fail-safe link having a bight portion with a hole for receiving a part of said fastener therein, a first leg with a first longitudinal slot for receiving therein a first headed member formed on said first coupling member, and a second leg with a second longitudinal slot for receiving therein a second headed member formed on said first coupling member, each of said first and second leg portions having a retaining plate overlying one end of said second tenon and one end of said second coupling slot to prevent said second tenon from sliding out of said second coupling slot of said second retainer.

59. A pipe coupling device according to claim 54, wherein said first and second coupling members include first and second fastener holes, respectively, for receiving said fastener therein.

60. A pipe coupling device according to claim 59, wherein said first fastener hole is threaded for threadedly engaging said fastener.

61. A pipe coupling device according to claim 60, wherein a portion of said second tenon of said second coupling member is deformed to retain said second tenon within said second coupling slot of said second retainer.

62. A pipe coupling device according to claim 59, wherein said fastener includes a bolt with a nut.

63. A pipe coupling device according to claim 47, wherein said first coupling member further includes a pair of links coupled at one of their ends to said first tenon, and a cradle coupled to the other ends of said links for engaging said fastener.

64. A pipe coupling device according to claim 63, wherein said second coupling member has a threaded fastener hole for threadedly receiving said fastener therein.

65. A pipe coupling device according to claim 64, wherein said cradle has a recess for engaging one end of said fastener such that said fastener is placed under compression between said second coupling member and second cradle.

66. A pipe coupling device according to claim 65, wherein said second coupling member includes at least one detent for engaging one of said links via a snap-fit.

67. A pipe coupling device according to claim 66, wherein said second tenon has first and second tenon ends with at least one of said tenon ends extending outwardly from said second coupling slot for limiting movement of said links.

68. A pipe coupling device according to claim 64, wherein said second coupling slot is a mortise for receiving and retaining said second tenon of said second coupling member therein.

69. A pipe coupling retainer for a V-pipe coupling device which is adapted to axially couple together a pair of pipes having peripheral end flanges with a pair of oppositely slanted contact surfaces, the slanted contact surfaces of the flanges having an annular outer envelope, said pipe coupling retainer comprising:

an arcuate bight portion including a first end, a second end, and an inner connecting surface extending along an arc between said first and second ends of said bight portion;

a first arcuate leg portion integrally form with said bight portion, and including a first inner surface extending from said connecting surface of said bight portion, said first inner surface having a first slanted gripping surface with a first slope for engaging one of the contact surfaces of the flanges of the pipes and a first non-gripping surface extending between said first gripping surface and said connecting surface, said first non-gripping surface having at least a first steep portion with a slope which is steeper than said first slope to avoid contact with the flanges of the pipes; and a second arcuate leg portion integrally form with said bight portion, and including a second inner surface extending from said connecting surface of said bight portion such that said first and second inner surfaces together with said connecting surface form an arcuate groove for receiving portions of the flanges of the pipes being joined together, said second inner surface having a second slanted gripping surface with a second slope for engaging the other contact surface of the flanges of the pipes and a second non-gripping surface extending between said second gripping surface and said connecting surface, said second non-gripping surface having at least a second steep portion with a slope which is steeper than said second slope to avoid contact with the flanges of the pipes, and said first and second steep portions of said first and second non-gripping surfaces being non-parallel to each other and located radially inwardly relative to said connecting portion.

70. A pipe coupling retainer according to claim 69, wherein
said first end includes an open pivot slot having a curved coupling surface extending through an arc greater than 180° and less than 360° for receiving and retaining a pivot, pin therein.

71. A pipe coupling retainer according to claim 70, wherein
said second end includes an open coupling slot having a coupling surface shaped to retain a tenon of a latch assembly therein.

72. A pipe coupling retainer according to claim 69, wherein
said first end has a closed pivot slot having a coupling surface.

73. A pipe coupling retainer according to claim 72, wherein
said coupling surface is a circular cylinder.

74. A pipe coupling retainer according to claim 73, wherein
said second end has a closed coupling slot having a coupling surface.

75. A pipe coupling retainer according to claim 69, wherein said steep portion of each of said first and second non-gripping surfaces includes a substantially planar portion.

76. A pipe coupling retainer according to claim 75, wherein each of said first and second non-gripping surfaces has a curved portion within the outer envelope of the contact surfaces of the flanges of the pipes.

77. A pipe coupling retainer according to claim 76, wherein said steep portions of each of said first and second non-gripping surfaces is positioned between its respective said curved portion and its respective said gripping portion.

78. A pipe coupling retainer according to claim 69, wherein each of said bight portion, said first leg portion and said second leg portion extends approximately 180°.

79. A pipe coupling retainer according to claim 69, wherein said first and second non-gripping surfaces have a curved portion with a large radius to lower stress within said retainer.

80. A pipe coupling retainer according to claim 79, wherein said radii of said curved portions are within a range from approximately 0.065 inch to approximately 0.085 inch.

\* \* \* \* \*